United States Patent
Mohanty et al.

(10) Patent No.: US 11,827,851 B2
(45) Date of Patent: Nov. 28, 2023

(54) TRACER ELUTING PROPPANTS FOR HYDRAULIC FRACTURING

(71) Applicant: Board of Regents, The University of Texas System, Austin, TX (US)

(72) Inventors: Kishore K. Mohanty, Austin, TX (US); Bochao Zhao, Austin, TX (US); Krishna Panthi, Cedar Park, TX (US); Robin Singh, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 17/379,659

(22) Filed: Jul. 19, 2021

(65) Prior Publication Data

US 2022/0017815 A1 Jan. 20, 2022

Related U.S. Application Data

(60) Provisional application No. 63/054,084, filed on Jul. 20, 2020.

(51) Int. Cl.
| | | |
|---|---|---|
| *C09K 8/80* | (2006.01) | |
| *C09K 8/88* | (2006.01) | |
| *E21B 43/267* | (2006.01) | |
| *E21B 47/07* | (2012.01) | |

(Continued)

(52) U.S. Cl.
CPC ............ *C09K 8/805* (2013.01); *C09K 8/882* (2013.01); *E21B 43/267* (2013.01); *E21B 47/07* (2020.05); *E21B 47/11* (2020.05); *E21B 49/0875* (2020.05); *E21B 2200/20* (2020.05)

(58) Field of Classification Search
CPC .......... C09K 8/805; C09K 8/80; C09K 8/685; C09K 8/62; C09K 2208/10; E21B 43/267; E21B 47/11; E21B 43/26
See application file for complete search history.

(56) References Cited

U.S. PATENT DOCUMENTS

| | | |
|---|---|---|
| 6,645,769 B2 | 11/2003 | Tayebi et al. |
| 6,723,683 B2 | 4/2004 | Crossman et al. |
| 2010/0307745 A1 | 10/2010 | Lafitte et al. |

(Continued)

FOREIGN PATENT DOCUMENTS

| | | | | |
|---|---|---|---|---|
| CA | 2955926 C | * | 11/2018 | ....... C04B 35/62807 |
| WO | 2013/078031 A1 | | 5/2013 | |
| WO | 2014/144464 A2 | | 9/2014 | |

OTHER PUBLICATIONS

Translation of CN-111100612-A. (Year: 2020).*

(Continued)

*Primary Examiner* — Zakiya W Bates
(74) *Attorney, Agent, or Firm* — Kilpatrick Townsend & Stockton LLP

(57) ABSTRACT

Tracer eluting proppants, such as proppants that have polymeric coatings on them that include tracers, such as a fluorescent dye. The tracer eluting proppants can comprise proppant particles coated with a polymeric coating that can elute tracer under some, but not all conditions. For example, the tracer can be eluted at elevated temperature, pH, and/or salinity conditions, but not elute at lower temperature, pH, and/or salinity conditions. Methods of making and using tracer eluting proppants are also disclosed, including methods for characterizing subterranean reservoirs.

34 Claims, 15 Drawing Sheets

(51) Int. Cl.
E21B 49/08 (2006.01)
E21B 47/11 (2012.01)

(56) References Cited

U.S. PATENT DOCUMENTS

2016/0075937 A1 3/2016 Cannan et al.
2018/0134949 A1* 5/2018 Monastiriotis ............ C09K 8/52

OTHER PUBLICATIONS

Asadi, M., et al., 2002. Monitoring Fracturing Fluid Flow-back With Chemical Tracers: A Field Case Study. Presented at the SPE Annual Technical Conference and Exhibition, Society of Petroleum Engineers. DOI:10.2118/77750-MS.
Bae, Y., et al., 2005. Preparation and Biological Characterization of Polymeric Micelle Drug Carriers with Intracellular pH-Triggered Drug Release Property: Tumor Permeability, Controlled Subcellular Drug Distribution, and Enhanced in vivo Antitumor Efficacy. Bioconjugate Chem 16, 122-130. DOI: 10.1021/bc0498166.
Basu, S., et al., 2014. A New Method for Fracture Diagnostics Using Low Frequency Electromagnetic Induction. Presented at the SPE Hydraulic Fracturing Technology Conference, Society of Petroleum Engineers. DOI: 10.2118/168606-MS.
Bhatia, K., et al., 2016. First Application of Nonradioactive Tracer Technology in CSG Unconventional Basin in Central India: Optimization and Evaluation of Fracturing Treatment. Presented at the SPE Asia Pacific Hydraulic Fracturing Conference, Society of Petroleum Engineers. DOI: 10.2118/181782-MS.
Catlett, RD., et al., 2013. Evaluation of Two Horizontal Wells in the Eagle Ford Using Oil-Based Chemical Tracer Technology to Optimize Stimulation Design. Presented at the SPE Hydraulic Fracturing Technology Conference, Society of Petroleum Engineers. DOI: 10.2118/163846-MS.
Cipolla, C.L., et al., 2002. Diagnostic Techniques To Understand Hydraulic Fracturing: What? Why? and How? SPE Production & Facilities 17, 23-35. DOI: 10.2118/75359-PA.
Eisner, L., et al., 2011. Challenges for microseismic monitoring, in: SEG Technical Program Expanded Abstracts 2011, SEG Technical Program Expanded Abstracts. Society of Exploration Geophysicists, pp. 1519-1523. DOI: 10.1190/1.3627491.
Fisher, M.K., et al., 2012. Hydraulic-Fracture-Height Growth: Real Data. SPE Production & Operations 27, 8- 19. DOI: 10.2118/145949-PA.
Gardien, C.J., et al., 1996. Hydraulic Fracture Diagnosis Using Chemical Tracers. Presented at the SPE Annual Technical Conference and Exhibition, Society of Petroleum Engineers. DOI: 10.2118/36675-MS.
Goswick, RA, et al., 2014. Utilizing Oil Soluble Tracers to Understand Stimulation Efficiency Along the Lateral. Presented at the SPE Annual Technical Conference and Exhibition, Society of Petroleum Engineers. DOI: 10.2118/170929-MS.
Johnson, L.M., et al., 2016. Core/Shell Systems for Delayed Delivery of Concentrated Mineral Acid. SPE Production & Operations 31, 351-361. DOI: 10.2118/173734-PA.
King, G.E., et al., 2011. Deciphering Chemical Tracer Results in Multi-Fractured Well Backflow in Shales: A Framework for Optimizing Fracture Design and Application. Presented at the SPE Hydraulic Fracturing Technology Conference, Society of Petroleum Engineers. DOI: 10.2118/140105-MS.
Kumar, A, et al., 2018. Diagnosing Fracture-Wellbore Connectivity Using Chemical Tracer Flow-back Data. Presented at the SPE/AAPG/SEG Unconventional Resources Technology Conference, Unconventional Resources Technology Conference. DOI: 10.15530/URTEC-2018-2902023.
Li, J., et al., 2016. Tracer Flow-back Based Fracture Network Characterization in Hydraulic Fracturing. Presented at the Abu Dhabi International Petroleum Exhibition & Conference, Society of Petroleum Engineers. DOI: 10.2118/183444-MS.

Maxwell, S.C., et al., 2002. Microseismic Imaging of Hydraulic Fracture Complexity in the Barnett Shale. Presented at the SPE Annual Technical Conference and Exhibition, Society of Petroleum Engineers. DOI: 77440-MS.
McDaniel, R.R., et al., 2007. A New Environmentally Acceptable Technique for Determination of Fracture Height and Width. Presented at the SPE Annual Technical Conference and Exhibition, Society of Petroleum Engineers. DOI: 10.2118/109969-MS.
McDaniel, R.R., et al., 2009. Determining Propped Fracture Width from a New Tracer Technology. Presented at the SPE Hydraulic Fracturing Technology Conference, Society of Petroleum Engineers. DOI: 10.2118/119545-MS.
Muhammad, F., et al., 2011. pH-Triggered Controlled Drug Release from Mesoporous Silica Nanoparticles via Intracelluar Dissolution ofZnONanolids. J. Am Chem Soc. 133, 8778-8781. DOI: 10.1021/ja200328s.
Robinson, B.A, et al., 1988. Reservoir Sizing Using Inert and Chemically Reacting Tracers. SPE Formation Evaluation 3, 227-234. DOI: 10.2118/13147-PA.
Roussel, N.P., et al., 2017. Introduction to Poroelastic Response Analysis-Quantifying Hydraulic Fracture Geometry and SRV Permeability from Offset-Well Pressure Data, in: Proceedings of the 5th Unconventional Resources Technology Conference. Presented at the Unconventional Resources Technology Conference, American Association of Petroleum Geologists, Austin, Texas, USA DOI: 10.15530/urtec-2017-2645414.
Salman, A, et al., 2014. Analysis of Chemical Tracer Flowback in Unconventional Reservoirs. Presented at the SPE/CSUR Unconventional Resources Conference—Canada, Society of Petroleum Engineers. DOI: 10.2118/171656-MS.
Seth, P., et al., 2018. Estimating Hydraulic Fracture Geometry by Analyzing the Pressure Interference Between Fractured Horizontal Wells, in: SPE Annual Technical Conference and Exhibition. Presented at the SPE Annual Technical Conference and Exhibition, Society of Petroleum Engineers, Dallas, Texas, USA DOI: 10.2118/191492-MS.
Shook, G.M., et al., 2009. Determining Reservoir Properties and Flood Performance From Tracer Test Analysis. Presented at the SPE Annual Technical Conference and Exhibition, Society of Petroleum Engineers. DOI: 10.2118/124614-MS.
Siepmann, F., et al., 2008. Polymer blends for controlled release coatings. Journal of Controlled Release 125, 1-15. DOI: 10.1016/j.jconrel.2007.09.012.
Tang, J.S., et al., 1991. Interwell Tracer Test To Determine Residual Oil Saturation In A Gas-Saturated Reservoir. Part I: Theory And Design. Journal of Canadian Petroleum Technology 30. DOI: 10.2118/91-03-08.
Tong, S., et al., 2016. Proppant transport study in fractures with intersections. Fuel 181, 463-477. DOI: 10.1016/j.fuel.2016.04.144.
Warpinski, N.R., et al., 2008. Stimulating Unconventional Reservoirs: Maximizing Network Growth While Optimizing Fracture Conductivity. Presented at the SPE Unconventional Reservoirs Conference, Society of Petroleum Engineers. DOI: 10.2118/114173-MS.
Watson, W.P., et al., 2010. Delayed-Release Coatings for Oxidative Breakers. Presented at the SPE International Symposium and Exhibition on Formation Damage Control, Society of Petroleum Engineers. DOI: 10.2118/127895-MS.
Weng, X., et al., 2011. Modeling of Hydraulic-Fracture-Network Propagation in a Naturally Fractured Formation. SPE Production & Operations 26, 368-380. DOI: 10.2118/140253-PA.
Zhang, P., et al., 2018. Mapping Proppant Distribution in Hydraulic Fractures in Cased Wellbores Using Low Frequency Downhole Electrical Measurements. Presented at the SPE Hydraulic Fracturing Technology Conference and Exhibition, Society of Petroleum Engineers. DOI: 10.2118/189884-MS.
Zhao, B., et al., 2019. Tracer Eluting Proppants for Shale Fracturing. Unconventional Resources Technology Conference, Society of Petroleum Engineers. DOI: 10.15530/urtec-2019-478.
Zoback, M.D., et al., 2012. The Importance of Slow Slip on Faults During Hydraulic Fracturing Stimulation of Shale Gas Reservoirs.

(56) References Cited

OTHER PUBLICATIONS

Presented at the SPE Americas Unconventional Resources Conference, Society of Petroleum Engineers. DOI: 10.2118/155476-MS.

* cited by examiner

TRACER ELUTING PROPPANTS FOR HYDRAULIC FRACTURING

CROSS REFERENCE TO RELATED APPLICATIONS

This application claims the benefit of and priority to U.S. Provisional Application No. 63/054,084, filed on Jul. 20, 2020, which is hereby incorporated by reference in its entirety.

FIELD

This application relates generally to proppants used in hydraulic fracturing operations and more particularly to tracer eluting proppants and use in characterizing hydraulic fractures.

BACKGROUND

Unconventional reservoirs, such as shales, are often hydraulically fractured to produce oil and gas at an economic rate. Long propped hydraulic fractures connected to pre-existing natural fractures can maximize productivity for ultra-low permeability shales. Fracture geometry (such as position and length) and conductivity affect well productivity. It is also important to characterize the created fracture system for hydraulic fracturing process optimization.

The following methods exist for hydraulic fracture characterization: seismic, tracers and logging. Microseismic monitoring is commonly conducted during hydraulic fracturing. The location of microseismic event can be used as a proxy for slip failure of fractures or faults that usually occurs during creation and propagation of a fracture. This method has a long detection distance and can create a time dependent map of the fracture system. However, this method does not indicate if the created fractures remain open. Microseismic activity could be affected by the in-situ stress and pore pressure; the fractures created by tensile opening are not detected. Pressure interference can also be used to understand hydraulic fracture geometry by observing the pressure changes in adjacent wells during fracturing in a treatment well. This method is useful for understanding the communication between wells and stages, but it cannot distinguish between propped and unpropped fractures, similar to the microseismic method.

Chemical tracers have also been used for unconventional reservoirs. Traditionally chemical tracers have seen widespread use in secondary and tertiary recovery for conventional reservoirs for determination of pore volume, swept volume and residual oil saturation. Chemical tracers have also been applied to unconventional shale reservoirs to assess fracture connectivity and evaluate stimulation effectiveness. Chemical tracers can be either water soluble or oil soluble. The tracer is introduced into the reservoir with the fracturing fluid or incorporated in the perforation process (or placed outside of liner downhole). After hydraulic stimulation, the tracer is collected along with the flow-back fluid and its concentration is analyzed. The shape and value of the flow-back curve can be used to determine fracture properties. The limitation of this method is that tracer data is subject to significant dispersion in the fracture system and quantitative interpretation of tracer data is challenging. One limitation of chemical tracer is that the tracer can be transported into unpropped fractures and fractures that are open but not connected to the wellbore. This has shown to cause difficulties in the interpretation of tracer test results as multiple peaks with varying peak location can arise due to unpropped fracture closure.

The previous methods fail to consider proppant transport during fracturing. Only fractures propped with proppant remain open when pressure is reduced (after fracturing) and contribute to production. Fractures that are opened during stimulation, but unpropped, close during production. Previous methods give information about fracture system during stimulation, but not the final fracture system when pressure is dropped and production begins. For example, slickwater with sand is used commonly in hydraulic fracturing of shales, because it creates long, skinny fractures (and is relatively inexpensive). One of the main concerns during the slickwater fracturing process is the proppant transport in fractures and fracture intersections. Due to higher density, sand settles and forms a sand bed; newly injected sand moves at the top of the sand bed and is deposited downstream. It is important to know the placement of proppant in addition to the geometry of the created fracture system. Neither microseismicity nor tracer can provide this information.

One potential method to directly detect proppants in the fracture is through logging. Chemicals can be embedded into proppants and detected by logging equipment, thus giving information about proppants distribution in fractures. These chemicals can be radioactive or semi-radioactive. However, this technique is limited by the radius of investigation of the logging tool, which is usually a few feet. Fractures can be hundreds of feet long, far out of the detection range of normal logging operation. In addition to radioactive proppants, electrically conductive proppants have also been proposed to directly map proppant distribution using electromagnetic borehole measurement for both open-hole and steel-cased wellbores. This method has the advantage that the proppant is non-radioactive and the detection radius of this method could be on the order of 100 ft. However, for through-casing detection, this method requires downhole installation of insulating gap and the signal is dominated by the fracture that is in directly in contact with the electrode on the casing.

SUMMARY

Disclosed are tracer eluting proppant compositions and methods of making and using tracer eluting proppant compositions. The disclosed proppant compositions include selectively activatable tracer eluting proppant particles that can release tracers at a desired point in time, such as when the proppant particles are positioned at their final points in a fracture in a reservoir. In this way, these tracers can be used to probe the locations of proppants within a reservoir to obtain a better understanding of how far the tracers extend within the reservoir.

The activatable proppant particles can be activated and begin eluting tracer at a particular temperature, at a particular pH, at a particular salinity, or combinations of these. These activatable proppant particles can be injected into a reservoir with a non-activating feed fluid, such as ambient temperature fresh water, and when they are subjected to reservoir conditions or brought into contact with fluid in the reservoir they can be activated and begin eluting tracer, such as on exposure to elevated temperatures, high pH, or high salinity conditions.

In a first aspect, proppant compositions are described. For example, a proppant composition may comprise a proppant particle and a coating on a surface of the proppant particle, such as a coating comprising a tracer and a polymer. The coating may be activatable under temperature, pH, and salinity conditions within a subterranean reservoir, and be stable or not activated under ambient conditions, when not in contact with a fluid, or when in contact with a low temperature (e.g., room temperature), low salinity, or low or neutral pH fluid (e.g., ambient temperature fresh water).

The coating may encapsulate the proppant particle, such that any desirable type of proppant particle can be used and benefit from the activatable coating. Example proppants include, but are not limited to sand, resin coated sand, ceramic proppants, sintered bauxite, walnut shells, glass, kaolin, zirconia, steel shot, alumino silicates, plastic pellets, aluminum pellets, ash, etc. Example proppants useful with the disclosed proppant compositions may also or alternatively include naturally occurring products like sand, or manufactured products, like ceramic proppants. Naturally occurring products that are processed, like resin coated sand, may also be used. The coated proppant can be mixed with non-coated proppant. Stated another way, the proppant composition can further comprise proppant particles, such as proppant particles that are not coated with a tracer eluting coating. In this way, tracer eluting proppant particles can be mixed with normal proppant particles to create a batch of tracer eluting proppant. As examples, the ratio of tracer eluting proppant particles to normal proppant particles can be from 1:1 to 1:1000. Examples where more tracer eluting proppant particles than normal proppant particles are also contemplated, such as where the ratio is greater than 1:1 (i.e., 10:1, 100:1, or greater).

The coatings may be very thin, such as having a thickness of from 1 µm to 20 µm, for example, which may be only a fraction or small percentage of the dimension of the proppant particle, and therefore not impact or only minimally impact the utility of the proppant particle. In examples, the coating may have a thickness of from 1.0 µm to 1.5 µm, from 1.5 µm to 2.0 µm, from 2.0 µm to 2.5 µm, from 2.5 µm to 3.0 µm, from 3.0 µm to 3.5 µm, from 3.5 µm to 4.0 µm, from 4.0 µm to 4.5 µm, from 4.5 µm to 5.0 µm, from 5 µm to 6 µm, from 6 µm to 7 µm, from 7 µm to 8 µm, from 8 µm to 9 µm, from 9 µm to 10 µm, from 10 µm to 11 µm, from 11 µm to 12 µm, from 12 µm to 13 µm, from 13 µm to 14 µm, from 14 µm to 15 µm, from 15 µm to 16 µm, from 16 µm to 17 µm, from 17 µm to 18 µm, from 18 µm to 19 µm, or from 19 µm to 20 µm. In some cases, the coating may have a thickness less than 1 µm. The amount, concentration, or loading of the tracer in the coating can vary, and may be selectable or determinable upon making the coated proppant. As little as 0.01 wt. % of the coating can be the tracer, with the remainder comprising the polymer and any impurities. In some cases, larger loadings, such as up to 10 wt. % or more of the tracer can be used. In examples, the tracer may have a concentration in the coating of from 0.05 wt. % to 5 wt. %, such as from 0.05 wt. % to 0.25 wt. %, from 0.25 wt. % to 0.5 wt. %, from 0.5 wt. % to 0.75 wt. %, from 0.75 wt. % to 1.0 wt. %, from 1.0 wt. % to 1.25 wt. %, from 1.25 wt. % to 1.5 wt. %, from 1.5 wt. % to 1.75 wt. %, from 1.75 wt. % to 2.0 wt. %, from 2.0 wt. % to 2.25 wt. %, from 2.25 wt. % to 2.5 wt. %, from 2.5 wt. % to 2.75 wt. %, from 2.75 wt. % to 3.0 wt. %, from 3.0 wt. % to 3.25 wt. %, from 3.25 wt. % to 3.5 wt. %, from 3.5 wt. % to 3.75 wt. %, from 3.75 wt. % to 4.0 wt. %, from 4.0 wt. % to 4.25 wt. %, from 4.25 wt. % to 4.5 wt. %, from 4.5 wt. % to 4.75 wt. %, or from 4.75 wt. % to 5.0 wt. %. The tracer may be homogeneously distributed in the polymer.

As noted above, the coating can be activatable under certain conditions. As used herein, the term "activatable" refers to a condition that is triggered upon exposure to a particular stimulus. In examples, a tracer containing coating, such as those used in the disclosed proppant compositions, can be activatable upon exposure to particular temperature, pH, or salinity conditions, such that only upon exposure to those conditions will tracer from within the coating be released to a fluid in contact with the coating (e.g., an aqueous fluid). In some cases, in an activatable coating, the tracer is releasable from the coating to an aqueous solution over time, such as an aqueous solution having a particular set of conditions, such as temperature conditions, pH conditions, and/or salinity conditions. For example, the tracer may be releasable when the aqueous solution has a temperature greater than 25° C., greater than 30° C., greater than 35° C., greater than 40° C., greater than 45° C., greater than 50° C., greater than 55° C., or greater than 60° C. As another example, the tracer may be releasable when the aqueous solution has a pH greater than 7, greater than 8, or greater than 9. As another example, the tracer may be releasable when the aqueous solution has a salinity greater than 10000 ppm, greater than 15000 ppm, greater than 20000 ppm, greater than 25000 ppm, greater than 30000 ppm, greater than 35000 ppm, greater than 40000, ppm, greater than 45000 ppm, or greater than 50000 ppm.

In some cases, one condition (i.e., one of elevated temperature, pH, or salinity) may be sufficient to allow the tracer to be releasable to the aqueous solution, though the conditions may be combinable. For example, the tracer may be releasable when the aqueous solution has a pH less than 8 or less than 7, such as when the aqueous solution has a temperature greater than 40° C., greater than 45° C., greater than 50° C., greater than 55° C., or greater than 60° C. or when the aqueous solution has a salinity greater than 20000 ppm, greater than 25000 ppm, greater than 30000 ppm, greater than 35000 ppm, greater than 40000, ppm, greater than 45000 ppm, or greater than 50000 ppm. As another example, the tracer may be releasable when the aqueous solution has a salinity less than 10000 ppm, such as when the aqueous solution has a temperature greater than 40° C., greater than 45° C., greater than 50° C., greater than 55° C., or greater than 60° C. or when the aqueous solution has a pH greater than 8 or greater than 9.

Any of a variety of tracers may be used in the proppant compositions described herein. Example tracers include, but are not limited to, dyes, such as fluorescent dyes (e.g., acridine dyes, cyanine dyes, fluorene dyes, luciferin dyes, oxazine dyes, phenanthridine dyes, rhodamine dyes, etc.), or chemical tracers (e.g., inert chemicals, such as fluorinated hydrocarbons like fluorinated benzoic acids; some simple salts like nitrate, bromide, iodide, or borates; deuterated compounds; DNA fragments, etc.). In some cases, compounds like surfactants can also be used. Fluorescent dyes may be preferred in some cases due to their low detection sensitivity, simple and selective detectability (optical detection), safety/toxicity profile, and low cost. Example tracers also include those comprising rare earth metals, such as a rare earth organometallic complex. In some cases nanoparticles may be used as tracers. Optionally, useful tracers may comprise radioactive elements (i.e., radioactive tracers).

A variety of polymers can be used in the proppant compositions described herein. Example polymers include, but are not limited to methacrylic acid polymers, acrylate polymers, methacrylic acid-ethylacrylate copolymer, and combinations and/or copolymers of these. Desirable polymers may have a property whereby they break down, dissolve, or generally release tracer materials upon being subjected to certain conditions, such as elevated temperature, pH, and/or salinity conditions, but not break down, dissolve, or generally release tracer materials under other conditions, such as ambient temperature (i.e., room temperature), low or neutral pH, and low salinity (e.g., less than 10000 ppm).

The tracer eluting proppants can be prepared using a low-complexity method and can be mixed with non-tracer eluting proppants (also referred to as "normal proppants") since the tracers that can be used can be those that are very easily detectable. In this way, a batch of tracer eluting proppants can be prepared and mixed with normal proppants prior to injection into a reservoir. An example method of making a proppant composition, such as a tracer eluting proppant may include providing a proppant particle, contacting the proppant particle with a polymeric solution to form a solution coated proppant particle, such as a polymeric solution comprising a polymer and a tracer dissolved in a solvent, and subjecting the solution coated proppant particle to conditions to evaporate solvent to form a tracer coated proppant particle, such as a proppant particle coated with the polymer and the tracer. Example tracers and polymers include those described above. Example solvents include acetone, ethanol, methanol, dichloromethane, dimethyl formamide, methyl ethyl ketone, etc. Useful solvents may include those that can dissolve the polymer and the tracer to form a homogeneous mixture, that do not react with the polymer or the tracer, and that have a high vapor pressure, allowing easy removal by evaporation. In one example, a batch of a tracer eluting proppant particles can be created by contacting proppant particles with a polymer solution, as described above, draining off excess polymer solution, and allowing the residual polymer solution to dry (i.e., evaporate solvent), leaving a thin coating of the polymer and tracer on the surface of the proppant particles. The polymer solution can be prepared by dissolving an amount of the polymer (e.g., 5 wt. %) and an amount of the tracer (e.g., 1 wt. %) in the solvent (e.g., 94 wt. %). Relative concentrations of the polymer and tracer can be adjusted, as desired, at this stage. In some cases, the identity of the polymer and, optionally, the tracer can be selected based on known or measured reservoir conditions, such as temperature, pH, salinity, etc. For example, a reservoir with a low pH but high salinity may benefit from a using a different polymer than in a reservoir with a higher pH and lower salinity.

In another aspect, the proppant compositions including a tracer eluting proppant can be used in various methods. In one example, a method of this aspect comprises providing a proppant composition, such as including a tracer eluting proppant, as described above, and injecting the proppant composition into a subterranean reservoir, such as during part of a hydraulic fracturing operation. Optionally, the injection process can be followed by a shut-in or soak period. Next, a fluid can be produced from the subterranean reservoir, and the concentration of the tracer in the fluid detected or monitored as a function of time. The concentration can be analyzed to evaluate the position of the proppant composition in the reservoir. In some cases, this process can be combined with other processes, such as seismic processes, to further evaluate the position of the injected proppant or the extent of fracturing, etc.

Analyzing the concentration of the tracer in the produced fluid can be performed using one or more numerical models for tracer transport, such as numerical models that use one or more reservoir conditions, such as temperature, pH, salinity, etc., tracer identity, polymer identity, dispersion coefficient, mass transfer coefficient, fracture porosity, proppant coating volume factor, tracer partitioning factor, etc. The numerical models can incorporate measured tracer concentrations over time to update the numerical model in real-time to better understand the extent of distribution of the proppant in the reservoir.

In some cases, methods of this aspect may use multiple different proppant compositions, such as including different proppants and/or tracers, in one or more hydraulic fracturing operations. Since some hydraulic fracturing operations, for example, may use multiple fracturing stages, it may be desirable for each fracturing stage to use a different tracer, which can allow for the extent of fracturing of each stage to be independently determined, even though the different stages may be processed at different times and/or using different conditions.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

DETAILED DESCRIPTION

Provided herein are tracer eluting proppants, such as proppants that have polymeric coatings on them that include tracers, such as a fluorescent dye. The tracer eluting proppants can be mixed with normal proppants or can be used by themselves. In some cases, very small concentrations of the tracer can be detected, so it may be useful to add a small amount of the tracer eluting proppant in a batch of normal proppants. Advantageously, the tracer eluting proppants can comprise proppant particles coated with a polymeric coating that can elute tracer under some, but not all conditions. For example, the tracer can be eluted at elevated temperature, pH, and/or salinity conditions, but not elute at lower temperature, pH, and/or salinity conditions. In this way, the tracer eluting proppant can be prepared and readied for injection into a subterranean reservoir while in a condition where the tracer is not eluted (e.g., while in cool, non-alkaline, freshwater), but switch to an eluting condition after being injected inside the reservoir, where temperature, pH, and/or salinity conditions can differ.

Figure 1:
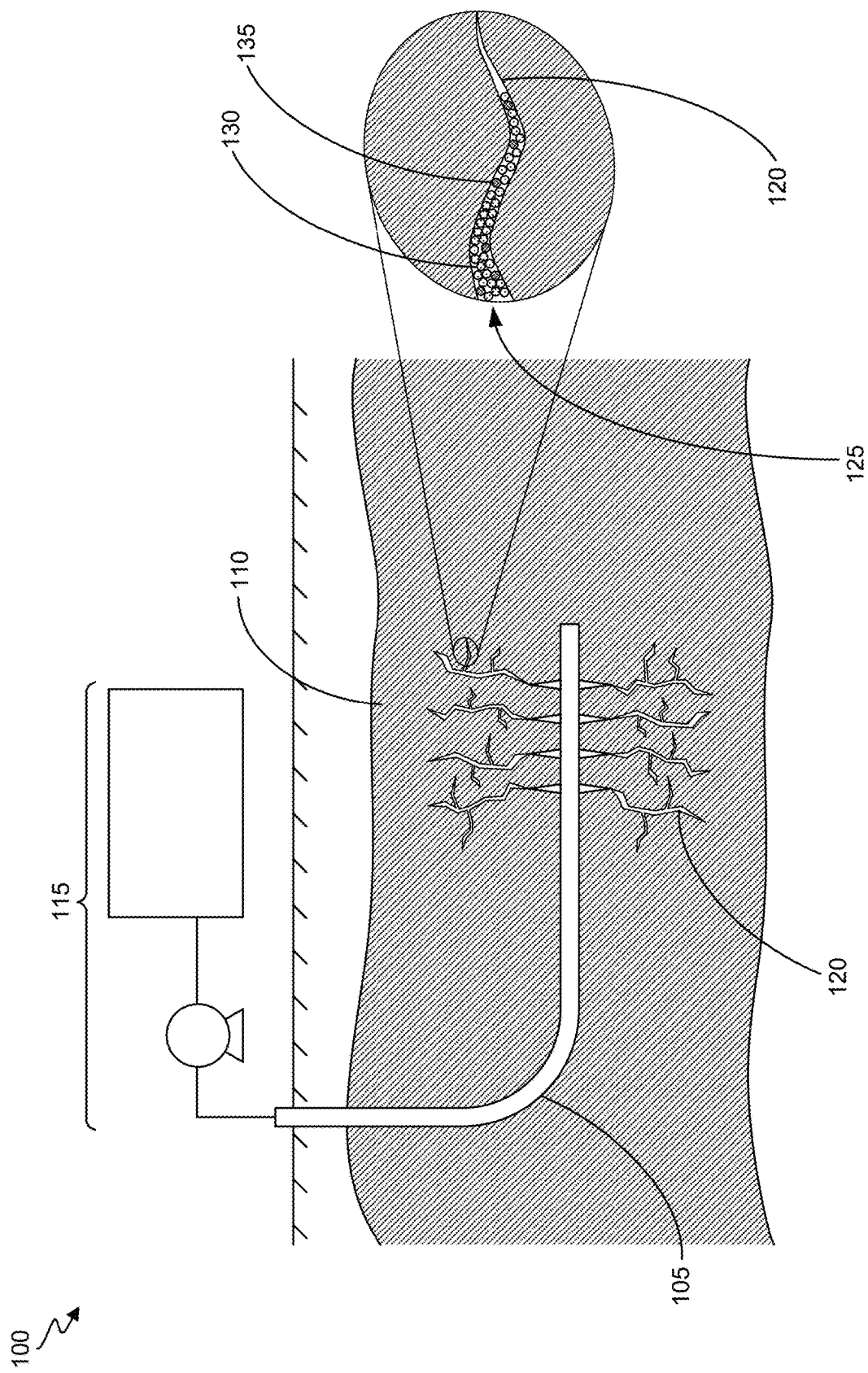
FIG. 1 provides a schematic illustration showing a well in a subterranean reservoir.

FIG. 1 provides a schematic illustration of an example site 100, where a well 105 is positioned in a subterranean reservoir 110. Well 105 may comprise vertical and/or horizontal segments and may extend through and to different formations or strata beneath the surface. Well 105 may be cemented, cased and/or perforated, as known in the art. Subterranean reservoir 110 may comprise a hydrocarbon-bearing formation. Surface equipment 115 may be useful for drilling, completion, stimulation, and/or production operations.

Hydraulic fracturing of subterranean reservoir 110 may be useful for stimulating and efficiently producing hydrocarbons from the formation. As illustrated, subterranean reservoir 110 includes fractures 120 created during a hydraulic fracturing operation. A tracer eluting proppant may be injected into fractures 120 and used to evaluate the position of the proppant and/or the extent of fracturing of the subterranean reservoir 110.

As shown in the expanded inset in FIG. 1, fractures 120 may be propped fractures, such as where a proppant composition 125 is present within the fractures 120. Proppant composition 125 may include proppants 130 and tracer eluting proppants 135. Proppants 130 may correspond to proppants that do not elute tracers (e.g., normal or conventional proppants). Tracer eluting proppants 135 may correspond to coated proppants described herein, such as those including a polymer coating containing a tracer.

Figure 2:
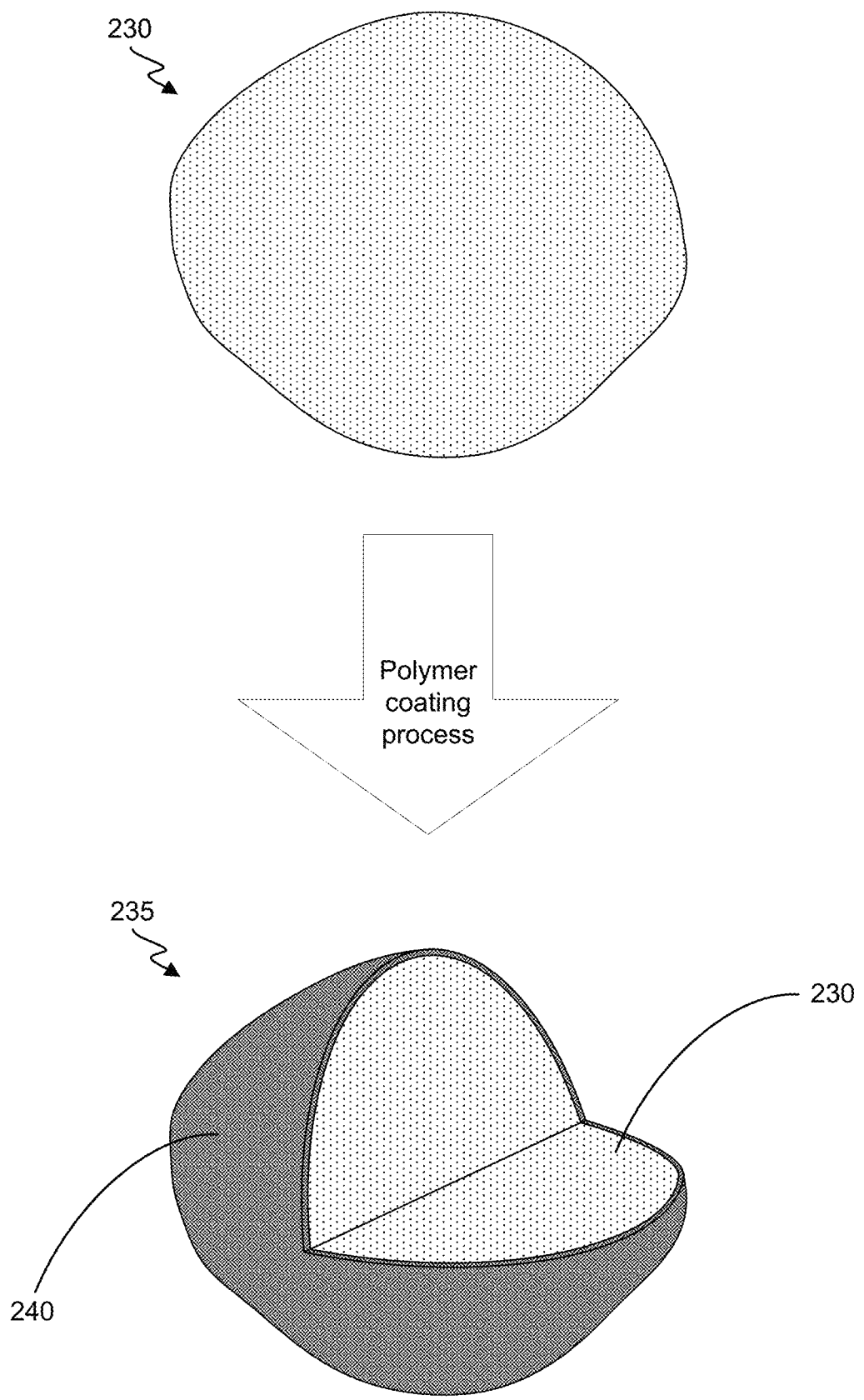
FIG. 2 provides a schematic illustration of a proppant particle and a cutaway of a tracer eluting coated proppant particle.

FIG. 2 shows an example of a proppant particle 230, which may be a normal or conventional proppant, such as sand, walnut shell, ceramic proppant, resin-coated sand, etc. To create a tracer eluting proppant particle 235, shown in a cutaway view in FIG. 2 to show the internal structure of tracer eluting proppant particle 235, proppant particle 230 can be subjected to a polymer coating process to create a polymeric coating 240 comprising a polymer and a tracer. As described herein, the polymeric coating 240 can elute tracer when positioned with fractures in a subterranean reservoir and under particular conditions, and not elute tracer during preparation, injection, etc. The polymeric coating 240 can be very thin, such as only a small percentage (e.g., less than 3%) of the radius, diameter, or cross-sectional dimension of the proppant particle 230.

The polymer coating process can comprise, for example, contacting the proppant particle 230 with a polymeric solution comprising a polymer, a tracer, and a solvent, and subjecting to conditions to evaporate solvent to form tracer eluting proppant particle 235. In one example, a batch of a tracer eluting proppant particles 235 can be created by contacting proppant particles 230 with a polymer solution, as described above, draining off excess polymer solution, and allowing the residual polymer solution to dry (i.e., evaporate solvent), leaving a thin polymeric coating 240 of the polymer and tracer on the surface of the proppant particles 230.

Figure 3:
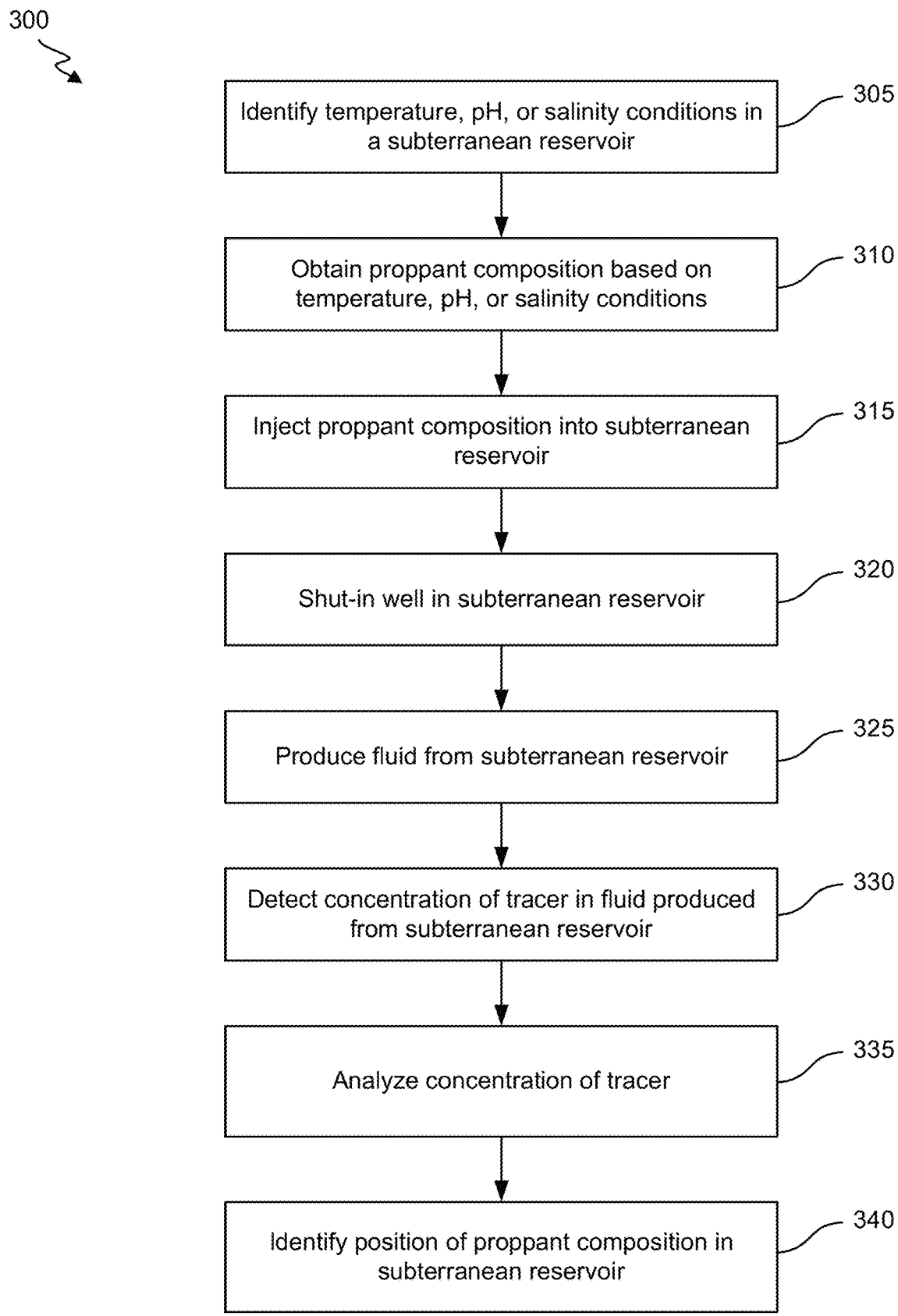
FIG. 3 provides an overview of an example method in accordance with some embodiments of the present invention.

The tracer eluting proppant particles 235 can be used in hydraulic fracturing operations, as described above with reference to FIG. 1. FIG. 3 provides an overview of an example method 300 of using tracer eluting proppant particles according to aspects disclosed herein.

Method 300 begins at block 305 by identifying a temperature, pH, or salinity conditions in a subterranean reservoir. Such a step may be optional, but can be useful for identifying a suitable tracer eluting proppant. The temperature, pH, or salinity conditions can be determined during well drilling or completion operations, for example.

Knowing the temperature, pH, or salinity conditions of the subterranean reservoir can inform which tracer eluting proppant to use. For example, tracer eluting proppants useful with low pH reservoirs may be different than tracer eluting proppants useful with high pH reservoirs. As another example, tracer eluting proppants useful with low temperature reservoirs may be different than tracer eluting proppants useful with higher temperature reservoirs. Accordingly, at block 310, a proppant composition, such as comprising a tracer eluting proppant, can be obtained based on the temperature, pH, and/or salinity conditions. In some cases, this may include manufacturing the tracer eluting proppant and/or mixing a tracer eluting proppant with another proppant.

At block 315, the proppant composition may be injected into the subterranean reservoir. This process may correspond to or comprise a hydraulic fracturing operation, but where the proppant composition containing the tracer eluting proppant is used. This may be useful for lodging tracer eluting proppant particles in hydraulic fractures in the subterranean reservoir.

At block 320, the well in the subterranean reservoir may be shut-in and or allowed to soak for a duration of time. Such a process may be optional, but is useful for some reservoirs to ensure good production following a hydraulic fracturing operation. During shut-in, the coating on the tracer eluting proppant may be activated, since the conditions in the reservoir may be different from those of the injection fluid (e.g., higher temperature, different pH, different salinity), allowing tracer to begin eluting from the coating. Diffusion processes can limit the extent of range of the tracer from the tracer eluting proppant particles during the shut-in process.

At block 325, fluid may be produced from the subterranean reservoir, such as flow-back fluid. This fluid may include both hydraulic fracturing fluid injected into the reservoir as part of block 315 as well as fluid present in the subterranean reservoir, such as brine or hydrocarbons. The fluid may contain tracer eluted from proppant particles held in fractures in the subterranean reservoir, and the concentration of tracer in the produced fluid can vary as a function of time, providing insights into the position of the proppant particles in the subterranean reservoir.

At block 330, the concentration of tracer in the produced fluid can be detected. In some cases, the detection process can comprise an optical detection process or another detection process, such as a chromatographic detection process. The detection process can allow for monitoring the concentration of the tracer in the produced fluid as a function of time.

At block 335, the concentration of the tracer can be analyzed. For example, the concentration can be subjected to a numerical model, which can be used to predict the expected concentration of the tracer based on various reservoir parameters, proppant parameters, fluid dynamic parameters, or the like. As examples, reservoir temperature, pH, and/or salinity, can be used in the numerical model. As other examples, tracer identity, polymer identity, dispersion coefficient, mass transfer coefficient, fracture porosity, proppant coating volume factor, and/or tracer partitioning factor, can be used.

The analysis at block 335 can be used to identify the position of the proppant particles in the subterranean reservoir, at block 340. In some cases, the position may be identified as a distance of the proppant particles from the wellbore rather than the absolute position of the proppant particles beneath the surface. The analysis at block 335 may be combined with additional techniques, such as seismic techniques, to better understand and identify the position of the proppant in the reservoir.

In some cases, all or portions of method 300 may be repeated one or more times. For example, in some cases, multiple injection processes (e.g., hydraulic fracturing operations) may be performed to increase the extent of fracturing within the subterranean reservoir. In some cases, different tracers can be used during the different injection operations. The different tracers can correspond to tracers that can be distinguished from one another during the detection and analysis processes of blocks 330 and 335, such that the position and extent of the fracturing of the reservoir that is achieved during different fracturing operations can be determined.

Aspects of the invention may be further understood by reference to the following non-limiting example.

Example 1—Tracer Eluting Proppants for Hydraulic Fracture Characterization

The drawback of directly injecting chemical tracers into a well is that the tracer cannot accurately reflect proppant distribution in the system. If a tracer can be incorporated on the proppant and be released after proppant placement, then information about proppant location can be estimated or determined. This technique can exploit two features of the tracer system. First, the proppant should not elute tracer at before and during proppant injection. Minimum amount of tracer should be released at these two stages. Second, the tracer should be released in sufficient amount after proppant placement under the reservoir condition or certain triggering conditions. These two aspects are analogous to the controlled release technology used in medicine. Delayed release of oxidative gel breakers has been used in hydraulic fracturing and controlled acid release has been applied for acid treatments. The controlled release technology is applied in this Example for diagnosis of hydraulic fracturing.

This Example describes a novel tracer-eluting proppant technology for estimation of proppant distribution in a hydraulic fracture system. In this technology, a chemical tracer is encapsulated inside a pH sensitive polymer coating on proppants. These proppants can be injected along with normal proppants. When proppants settle inside the fracture, tracer can be released due to the reservoir temperature, salinity or pH conditions and be collected in the flow-back fluid. This Example evaluates the tracer eluting properties of these novel proppants and estimates their position in the fracture from the flow-back water analysis.

Methodology. Materials. 40/70 mesh Ottawa sand was used as the proppant. Methacrylic acid-ethyl acrylate copolymer was used as the polymer. Rhodamine 6G, ethanol (>99.5%) and sodium chloride were used as received. Deionized water (with a resistivity greater than 18.2 MΩ-cm) was used to prepare aqueous solutions. The pH of the various solutions was measured using pH meter with the precision of ±0.01. The pH electrode was calibrated with standard pH buffer solutions of pH 4, 7, and 10. Buffer used to control pH includes: pH 8.0 buffer (Potassium phosphate monobasic, sodium hydroxide), pH 9.0 buffer (Boric acid, potassium chloride, sodium Hydroxide Buffer, pH 10.0 buffer (Potassium carbonate, potassium hydroxide, potassium borate), pH 11.0 buffer (Boric acid, sodium hydroxide, potassium chloride), pH 12.0 buffer (Sodium hydroxide, sodium phosphate).

Tracer-eluting proppant fabrication. 5 wt. % polymer is first dissolved in acetone. The chemical tracer of choice is then dissolved in the polymeric solution. Rhodamine 6G was selected as the tracer for its easy detection with an UV-vis spectrometer, but other tracers can be used as long as the tracer can be dispersed in the polymeric solution and is soluble in water. The proppant of choice is then put into the solution and mixed thoroughly. 40/70 mesh Ottawa sand was used in this work, but other proppants can be used. Then the polymeric solution is drained out, leaving the proppants and the liquid trapped around the proppants. The proppants are then placed in a well-ventilated hood for the acetone to evaporate. When the acetone evaporates, the polymer forms a layer of coating around the sand surface, while trapping some tracer inside the coating. In this way, tracer is encapsulated in the polymer coating around the proppant. The tracer loading can be tuned by changing the amount of tracer dissolved in the polymer solution. The entire batch process can be finished in one hour and no chemical reaction or heating is required.

Tracer elution tests. Ideally, the tracer should remain in the coating on the proppant during proppant injection in fractures until the proppants settle completely. After proppant placement, the tracer should be released. If the tracer is released during injection period, then it cannot give effective information about the final location of proppants. On the other hand, if the tracer is released too slow after proppant placement, a low tracer concentration in the flow-back liquid may pose difficulty in the detection process. Therefore, the ability of the proppant to retain and release the tracer is important for its applicability. To study this, batch tracer release tests were performed.

In these tests, coated proppants were mixed with a certain volume of a liquid (such as brine at a certain pH) at a constant temperature. A small sample of the liquid was taken periodically and its UV-vis absorbance was measured. Rhodamine 6G has a significant absorption peak around 530 nm. Based on the absorption value, rhodamine concentration can be calculated from a standard curve. The amount of tracer released was calculated as a function of time. Tracer-embedded proppants were immersed in DI water at 4 different temperatures: 25° C., 60° C., 90° C. and 125° C. and the elution was studied. The pH of water was changed to 8, 9, 10 and 11 to study the effect of pH. The salinity of the water was varied to 50,000 ppm, 100,000 ppm and 150,000 ppm to study the effect of salinity.

Fracture cell tracer elution tests. The batch test can be used to identify the release condition for tracer eluting proppants. After the batch test, dynamic tracer release tests were conducted in a model fracture system. The fracture system was constructed using a 2-inch diameter and 1 ft long Texas Cream limestone core. The core was cut in half longitudinally along the central axis and sand was placed between the cut surfaces to serve as proppants. Then the core was put back together, wrapped in a heat-shrink film and put into a Hassler coreholder. The Texas Cream limestone core acts as the matrix and the space between the half core acts as the fracture propped by proppants. The fracture volume (FV) was obtained and validated using two methods. In the first method, FV was obtained by multiplying the average fracture width with the fracture area and then subtracting the proppant volume. In the second method, a salinity tracer test was conducted in the fractured core. In this tracer test, the fracture was first saturated with 1% NaCl brine, then 6% NaCl brine was injected and the effluent salinity was analyzed. The fracture volume is estimated to be the volume corresponding to 0.5 normalized concentration (after considering the dead volume). In all experiments, these two methods resulted in consistent fracture volume estimations. The fracture volumes for the experiments 1, 2 and 3 were 12, 13 and 13.5 ml, respectively.

For the dynamic tracer release test, a certain amount of tracer-eluting sand was placed at specific locations on the fracture while ordinary sand was used to cover the rest of the fracture. The core and the fracture space were pre-saturated with 1% NaCl brine. Next, a slug of pH 12 buffer (with the volume of the fracture space) was injected to trigger the release of tracer on tracer-eluting proppants. After injection, the buffer flow was stopped for 12 hours to mimic the shut-in time in the field and to allow sufficient time for tracer release. Finally, 1% NaCl brine was injected from the opposite direction to mimic the flow-back period and the effluent from the fractured core was analyzed for the tracer. Three experiments with different tracer-eluting sand loading and location were conducted, as shown in Table 1.

TABLE 1

Fracture cell tracer release

| Expt. No. | Tracer eluting sand load (g) | Tracer eluting sand location and coverage area (with respect to total fracture area) | Tracer eluting sand load/length of coverage (g/ft) | Tracer peak concentration (ppm) | Tracer peak location (FV) | Tracer collected at 8 FVs of flow-back (% of total initial loading) |
|---|---|---|---|---|---|---|
| 1 | 1.06 | Middle, 10% | 10.6 | 2.79 | 0.66 | 16.0% |
| 2 | 0.26 | Middle, 10% | 2.6 | 0.64 | 0.53 | 17.5% |
| 3 | 1.32 | Inlet end, 20% | 6.6 | 1.70 | 0.14 | 9.4% |

Figure 4A:
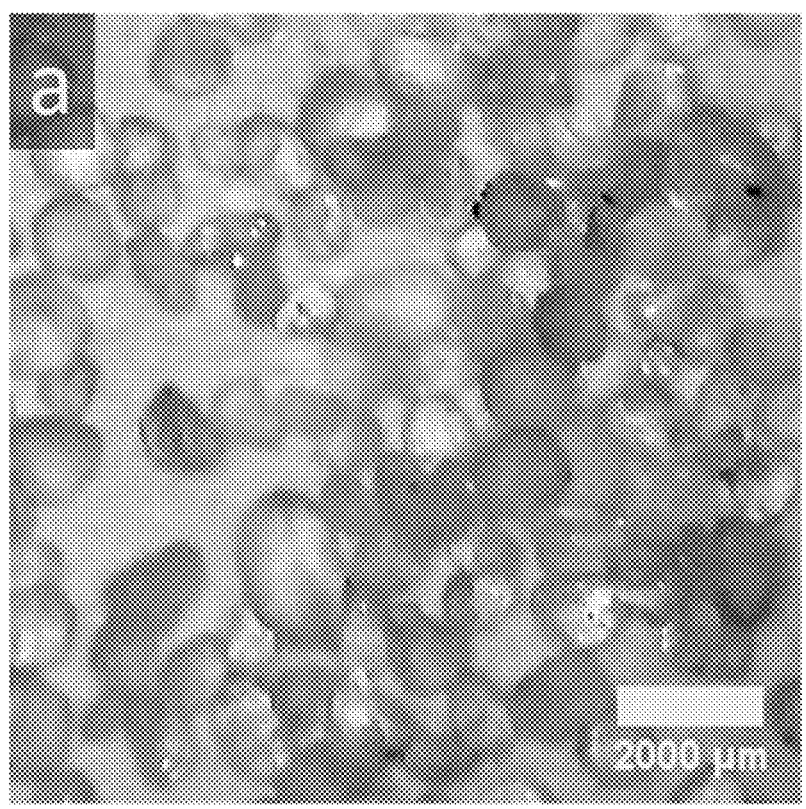
FIG. 4A provides an optical micrograph of proppant particles.
Figure 4B:
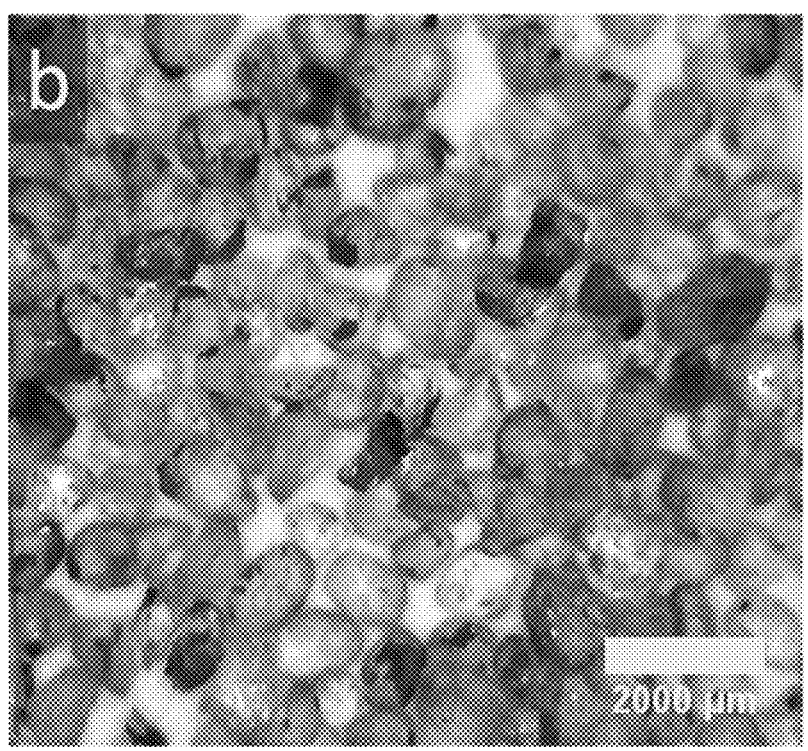
FIG. 4B provides an optical micrograph of proppant particles with a tracer eluting coating.

Experimental Results. Polymer-coated Proppants. Optical micrographs of the proppants before (FIG. 4A) and after coating (FIG. 4B) with the polymer containing Rhodamine 6G (tracer) are shown in FIG. 4A and FIG. 4B. Rhodamine 6G has a purple color in the visible wavelength. Coated sand grains gained a purple color, indicating a coating of tracer containing polymer on the proppant surface. To estimate the average coating thickness, first, the dry coated-proppants were weighed. Then, they were put into an alkaline solution (pH>12) to dissolve the polymer coating. The proppants were then dried and weighed again. Based on the weight difference and polymer density, average coating thickness was calculated to be 3.8 μm, which is only 1-2% of the sand grain radius. Such a thin coating ensures minimal changes in proppant density due to coating. This is crucial as it ensures that tracer-coated proppant is a good representation of the proppants injected. The proppants dispersed in water (and did not stick together), indicating that the proppants were water-wet after coating.

Tracer elution in DI water. Tracer-eluting proppants are placed in a bath of DI water at a constant temperature and the tracer concentration in the water was monitored. The fraction of the embedded tracer released is shown as a function of time in FIG. 5 for each temperature. The total tracer loading was calculated by placing the proppants into a pH 12 buffer (dissolves the polymer and releases all of the tracer) and measuring the tracer concentration. The average Rhodamine loading on proppant was 0.5 mg of Rhodamine per gram of proppant. The water to proppant ratio in all batch release experiments was between 400 to 500 gm of water per gm of proppant. The maximum Rhodamine concentration in solution was 1.5 ppm. The detection limit of rhodamine in solution was 0.1 ppm, which ensures an accurate detection of the tracer concentration.

At 25° C. and 60° C., the tracer was not detected in a 24-hour period. In fact, no tracer was detected even after 1 week. This shows that the tracer-eluting system is very stable at a low salinity and low temperature, making the transportation and storage of these proppants easy. As the temperature increased, the tracer started to get released. At 90° C., approximately 20% of the tracer loaded was released in a 24-hour period. At 125° C., almost all of the tracer was released within 10 hours. A faster release at higher temperature is expected because of increased diffusion of the tracer in the coating and mass transfer into the surrounding water.

Tracer elution by pH change. The proppants were first immersed in DI water. Then, a pH buffer was added to the solution. The pH of the solution was maintained at a certain value adding more buffer, if necessary. The tracer release is shown in FIG. 6A-FIG. 6D. For the experiment at 90° C. (FIG. 6C), the buffer was added at around t=21 hours. For the experiments at 25° C. (FIG. 6A), 60° C. (FIG. 6B), and 125° C. (FIG. 6D), the buffer was added at t=0. Note that even though the buffer was added, the overall salinity of the solution was still very low. At 25° C., 60° C., and 90° C., increasing pH above 9 caused the tracer to be released completely. The time needed for complete release was around 10 hours, 5 hours and 1 hour under 25° C., 60° C., and 90° C., respectively again indicating an increase in the tracer release with temperature. A pH of 8 was insufficient for a rapid release of the tracer. At pH of 8, only around 10-20% of the total tracer was released in 2 weeks at 25° C., 60° C. and 90° C. At 125° C., increasing the pH led to a rapid release of the tracer, especially for pH of 9 and 10. However, as indicated in the previous section, even at neutral pH, the tracer is completely released in 10 hours. Additionally, it seems that the level of pH has a less significant effect on the rate of tracer release compared with temperature (which is the dominant factor). A pH of 9 is often sufficient for a rapid and complete release of the tracer. Further increase in pH to 10 or 11 leads to an increase in the release rate, but the increase is not very significant.

Tracer elution by salinity change. All previous experiments were conducted at a low salinity (similar to fresh fracturing water). However, many of the shale reservoirs have highly saline formation water. It is necessary to study the effect of salinity on tracer release for determining whether tracer-eluting proppants technology can be applied to these reservoirs. In this experiment, proppants were placed in NaCl solution of different salinity: 50,000 ppm, 100,000 ppm and 150,000 ppm instead of DI water at different temperatures. The results are plotted in FIG. 7A, FIG. 7B, and FIG. 7C. At room temperature (FIG. 7A), increasing the salinity led to 10-20% tracer release over a 150-hour period. However, the release stopped and did not increase further with time. At 60° C. (FIG. 7B) and 90° C.

(FIG. 7C), increasing salinity led to complete and faster release of tracer compared with the case of DI water. The time required for complete release was around 100 hours and 30 hours for 60° C. and 90° C., respectively. Note that this is significantly longer than the 5 hours and 1 hour for high pH cases, meaning that the tracer release by high salinity is a much slower process than by changing pH. During the experiment, pieces of the polymer coating were observed to detach from the proppants under high salinity environment. This suggests that the instability of coating under high salinity triggered the release of tracer in these experiments. Furthermore, the tracer release rate was about the same for the salinity ranging from 50,000 ppm to 150,000 ppm, indicating that 50,000 ppm is sufficient to induce tracer release.

Fracture cell tracer elution tests. We conducted three experiments with different sand loading and location and the results are summarized in Table 1. All three experiments were conducted with 12 ml of pH 12 buffer with 12 hours of shut-in time at 25° C. The tracer concentrations from the collected effluent for all three experiments are plotted together in FIG. 8A and FIG. 8B, with FIG. 8B showing an expanded view of the 0-2 fracture volume (FV) range. To better compare the shape of the concentration curves, all concentrations are normalized against the peak concentration of each experiment.

For Experiments 1 and 2, the peak tracer concentration occurred between 0.5 and 0.6 FV, which is expected because the tracer was placed at the center of the fracture. For Experiment 3, the peak concentration was at 0.14 FV. In this experiment, the tracer eluting proppants were placed in the upstream 20% of the fracture; the theoretical peak is at 0.1 FV. This proves that the tracer peak can be used to estimate the proppant location in the fracture. This experiment also shows that most of tracer release happened during the shut-in period.

A long tail (greater than 8 FVs) is observed in the tracer concentration curve for all three experiments. This signifies that the tracer collected in the tail was not released during shut in, but after the start of the flow-back. This is because the tracer release from proppants to the fluid is governed by an equilibrium process. During shut-in, tracer is released from the proppants until an equilibrium concentration is reached. During flow-back, tracer concentration decreases around proppants and shifts the equilibrium so that more tracer is released, thus causing the long tail in tracer recovery.

Figure 9:
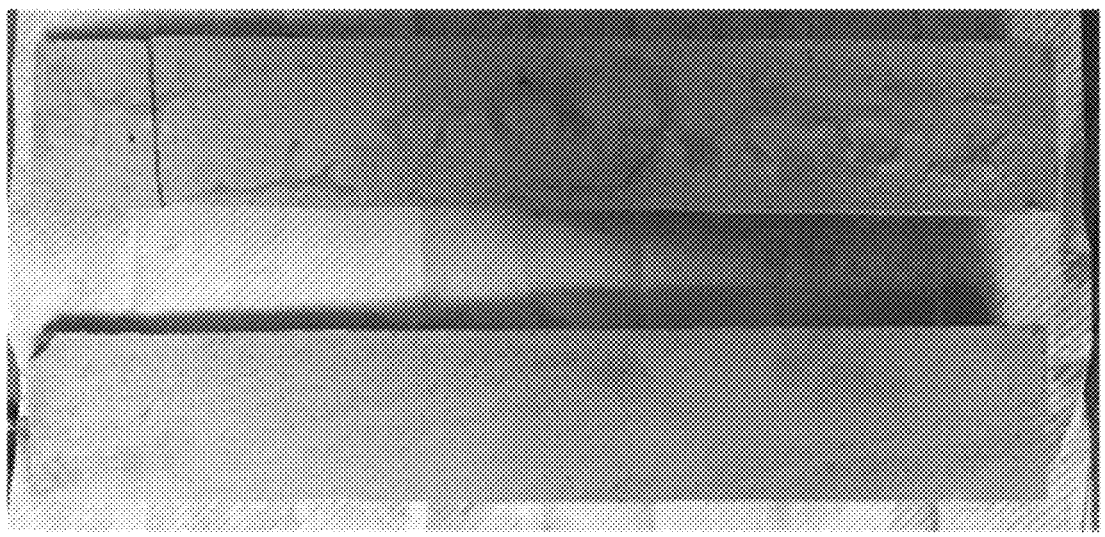
FIG. 9 provides images of core halves after the elution experiments.
Figure 9:
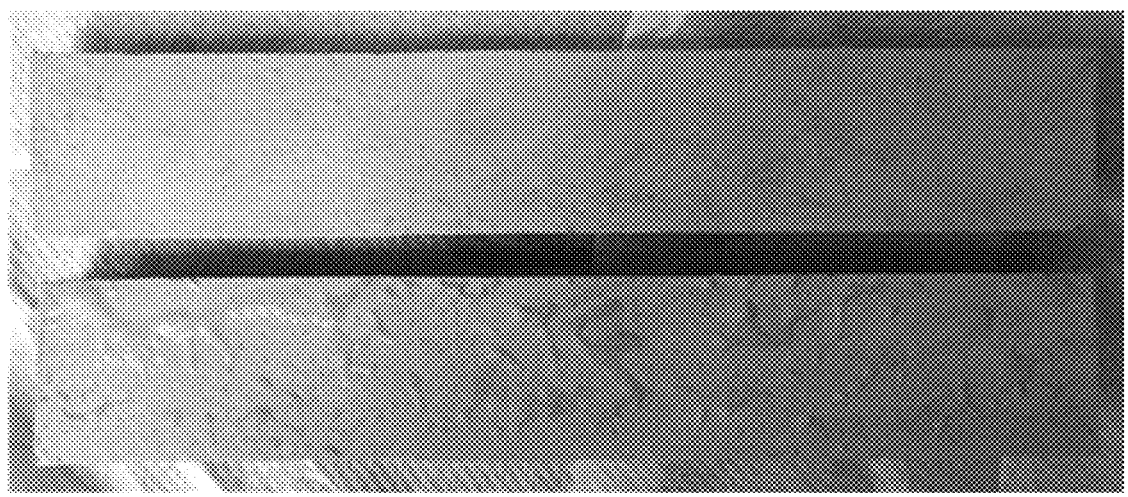
Figure 9:

The amount of tracer collected in the outlet can be compared with total amount of tracer in the fracture (calculated from the proppant mass). 16.0%, 17.5% and 9.4% of the total tracer was collected in the flow-back for Experiments 1, 2 and 3, respectively. The relatively low amount of tracer recovery is partly due to tracer absorption into the matrix (limestone in this case) during shut-in. To confirm the tracer absorption into the matrix, after each experiment the core was taken apart and pictures were taken. The pictures of core halves in Exp. 1-3 are shown in FIG. 9 (Top: Exp. 1; Middle: Exp. 2; Bottom: Exp. 3). It can be observed that parts of the limestone cores became pink, showing rhodamine absorption into the rock matrix. Note that the pink color is most significant where the tracer-eluting proppant was initially deposited, which suggests that absorption happened during shut-in time in the area adjacent to tracer-eluting proppants due to the high tracer concentration. Also, it can be observed that tracer absorption into matrix in Experiment 3 is more significant than Experiment 1 and 2. This explains the lower percentage of collected tracer for Experiment 3. The absorption effect is expected to be less in shales where the porosity and permeability are significantly lower than the limestone matrix used in these experiments.

The feasibility of using tracer-eluting proppants to understand proppants locations is demonstrated here through proof of concept fracture cell experiments. Most of the tracer was released during the shut-in period and a sensible peak was detected in the flow-back curve. The peak concentration time increased with the distance of the tracer-eluting proppants from the injection port. The fractional tracer release will improve in the field where temperatures are higher, shut-in time is longer and tracer transport into the shale matrix is lower.

Numerical model for tracer release. A numerical model is developed for tracer transport during the flow-back process to validate previous experimental observations. The major assumptions of the model are as follows. The tracer can exist either in the water (within the fracture), on the proppants or absorbed in the shale matrix. During shut-in (soaking), the tracer is released from the proppants and reaches an equilibrium concentration within the water, proppants and shale matrix at the tracer loaded location (as seen in FIG. 9). Before the flow-back, tracer can exist only at areas loaded with tracer-eluting proppants. The initial tracer concentration is zero elsewhere. During the flow-back, tracer can be released from proppants into the water depending on the concentration difference between proppants and water. During the flow-back, the mass transfer in or out of the shale matrix is considered slow and neglected.

The mass balance equation for the tracer is:

$$\phi \frac{\partial c}{\partial t} + \phi_p \frac{\partial c_p}{\partial t} \delta(x) = \phi D \nabla^2 c - v \phi \nabla c. \tag{1}$$

The mass balance of the tracer in the proppants is modelled as:

$$\phi_p \frac{\partial c_p}{\partial t} = -k(c_p - c)\delta(x). \tag{2}$$

Here c is the tracer concentration in the propped fracture water, $c_p$ is the tracer concentration in the tracer-eluting proppants, $\phi$ is the porosity of the fracture, $\phi_p$ is a factor accounting for the polymer coating volume of the proppants, D is the dispersion coefficient, v is the interstitial velocity, k is the mass transfer coefficient, $\delta(x)$ is a function for tracer loaded area so that $\delta$ is 1 where tracer eluting proppants are loaded and $\delta$ is 0 elsewhere. $c_0$ is the tracer concentration in the water just before flow-back and $c_i$ is the tracer loading on tracer eluting proppants (500 ppm).

Initial conditions are:

$$c(x, 0) = c_p(x, 0) = c_0 \delta(x), \tag{3}$$

$$c_0 = \frac{c_i * \phi_p}{\phi_p + \phi + \phi_m} = \frac{c_i * f_p}{f_p + 1 + f_m}\left(f_p = \frac{\phi_p}{\phi}, f_m = \frac{\phi_m}{\phi}\right), \tag{4}$$

$$f_p = f_p^n * l_p. \tag{5}$$

Boundary conditions are:

$$c(0, t) = 0, \quad (6)$$

$$\frac{\partial^2 c(L, t)}{\partial x^2} = 0. \quad (7)$$

$\phi_m$ is a factor accounting for volumes of matrix and partitioning of tracer between fracture water and matrix. $f_p$ and $f_m$ are $\phi_p$ and $\phi_m$ normalized with respect to $\phi$, $l_p$ is tracer eluting proppant loading per unit length (specified in Table 1), $f_p''$ is $f_p$ normalized with respect to $l_p$, and L is the length of the system.

Figure 10:
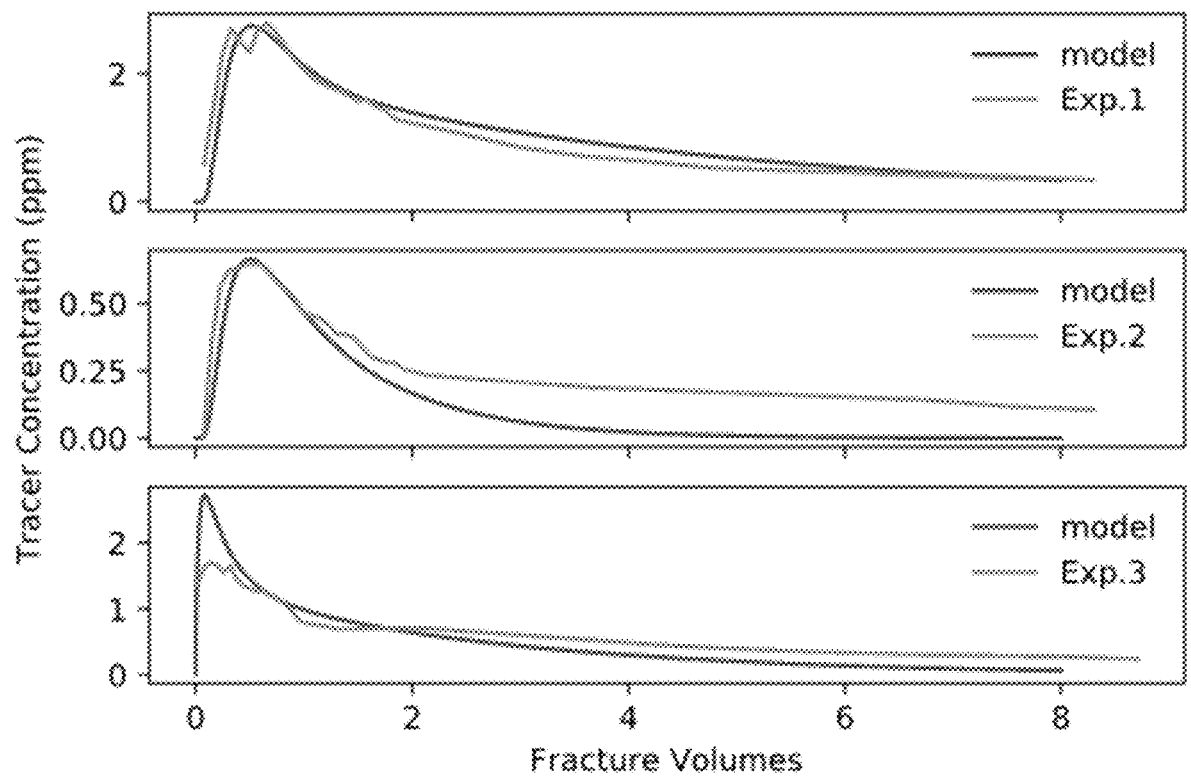
FIG. 10 provides data showing a comparison of tracer recovery curves for elution experiments.

Substituting Eq. 2 into Eq. 1 and dividing Eq. 1 and Eq. 2 by $\phi$ gives the final governing equations:

$$\frac{\partial c}{\partial t} - K(c_p - c)\delta(x) = D\nabla^2 c - v\nabla c \quad (8)$$

$$f_p \frac{\partial c_p}{\partial t} = -K(c_p - c)\delta(x) \quad (9)$$

where K=k/$\phi$. The model has a total of 4 parameters: D, K, $f_p''$, $f_m$. The 4 four parameters are tuned to match the tracer recovery curve of Experiments 1-3. D, K, $f_p''$ were kept the same for all three experiments while fin was allowed to change between experiments. The best matched curves and fitted parameters are shown in FIG. 10 and Table 2, respectively. The peak concentration times were well-matched and corresponded to the distance of tracer-eluting proppants from the core outlet.

TABLE 2

Fitted parameters for Experiment 1-3.

| | D (m$^2$s$^{-1}$) | K (s$^{-1}$) | $f_p''$ (ft * g$^{-1}$) | $f_m$ |
|---|---|---|---|---|
| Exp. 1 | 1.55 × 10$^{-5}$ | 0.09 | 0.4 | 110 |
| Exp. 2 | 1.55 × 10$^{-5}$ | 0.09 | 0.4 | 110 |
| Exp. 3 | 1.55 × 10$^{-5}$ | 0.09 | 0.4 | 230 |

Satisfactory match was obtained with the tracer profiles from Experiments 1 and 2. For Experiment 3, the modelled tracer concentration profile is narrower than the experimental observation. This is because the current model did not consider diffusion during shut-in. For Experiment 1 and 2, since the tracer-eluting proppant is located away from the outlet, the tracer profile gets dispersed as they travel to the outlet. This dispersion dominates over diffusion during shut-in and therefore diffusion effect can be neglected. For Experiment 3, the tracer-eluting proppant is located very close to the outlet. Therefore, the tracer profile travels a small distance before getting produced and is subject to less dispersive mixing. In comparison, the effect of diffusion during shut-in is more significant and neglecting diffusion leads to a narrower peak in our model (than in the experiment). As the length-scale increases in the field experiments, the effect of dispersion will further dominate over diffusion. Therefore, for field-scale modeling, diffusion can be neglected.

The factor, $f_m$ is similar for Experiments 1 and 2. $f_m$ for Experiment 3 is higher than Experiment 1 and 2. This agrees well with the observed less tracer recovery and more tracer absorption for Experiment 3. This tracer release model is a simple linear model that appears to fit the experiment results.

This model can be tested in more complex fracture geometry and correlations can be developed between peak time and proppant location.

Potential for field application. The tracer eluting proppant systems are very stable under low salinity and low temperatures (up to 60° C.). This means that the tracer eluting proppants can be easily transported and stored, whether in its dry form or mixed with fracturing fluid before injection. As indicated above, temperature, pH and salinity all play a role in determining the tracer release rate from proppants. Most shale reservoirs are hot and formation brine salinities are high. As the proppants are injected with cold, fresh (e.g., low salinity) fracturing fluid the tracer would not be immediately released. As the proppants settle into the fractures, the temperature of the fluid would increase due to the subsurface temperature and the salinity of the water would increase due to mixing with the formation brine. These changes would trigger the release of tracer during the shut-in period. As the fracturing fluid is produced back, the tracer would be produced with the flow-back water. If the temperature or salinity of the reservoir is not high enough to release the tracers, pH can be increased to trigger tracer release. This would involve injecting an alkaline slug of water after the proppant placement. For example, an alkaline water slug can be injected as the last step during a fracturing job after the injection of proppant or during drill out of plugs. Release tests should be conducted with the formation brine and fracturing water mixtures at several temperatures to identify the effective polymeric coating for the proppants for a specific reservoir.

If the tracer eluting proppants are injected towards the end of the proppant injection (after injecting most of the regular proppants), they would likely travel the farthest and give the estimate of the propped length. Currently unconventional wells often consist of multiple stages. To identify tracer from each stage, unique tracers need to be used for each stage. After the tracer is released from the proppants, the tracer would flow back together with the fluid and be collected at the wellhead in the flow-back fluid, where the tracer concentrations could be measured. From the tracer concentration with time, the location of proppants could be estimated for each stage. In each stage, there may be multiple fractures. The tracer concentration would estimate the distance travelled in each fracture. This method can be combined with fluid tracers and microseismicity for a more accurate characterization of hydraulic fractures.

Actual fracture systems in the field are expected to be much more complex than our lab and simulation fracture systems described in this Example. Field tests may be useful for evaluating the efficacy of the tracer eluting proppant technique. To scale up this technique to field application, various concerns are identified below.

Many general challenges may apply to our system. For example, proppants can be injected into multiple perforation clusters during a stage. The resulting tracer flow-back profile will be the superposition of multiple major fracture systems. One way to address this may be to inverse model the superposed signal and try to identify the fracture system. Another way to address this may be to calculate an effective-fracture length when separating individual peaks proves to be difficult. If the fluid is communicating between multiple stages, then the flow-back profile may be a superposition of fractures across different stages. The tracer-eluting proppant system may work best when there are minimal communication between stages and clusters. For more complex fracture systems, getting quantitative information out of tracer test may be challenging. For these complex systems, a combination of tracer-eluting proppant and existing methods may work the best.

Fractures may be long and complex systems. Actual fracture system are generally not perfectly linear/planar in nature; fractures may contain segments of well-propped and less-propped fractures. Our model assumes the tracer released from the proppant will stay in the propped section of the fracture system during flow-back. As long as the propped segment has good continuity, this assumption is reasonable. However, longer distance will lead to more dispersion and difficulty in peak identification.

Flow in the well may not be a single injection-production process. For example, after fracturing during the drill out of the plugs, some frac fluid is introduced into the fracture. During this time, there is flow from wellbore into the fracture. Qualitatively, this will lead to retardation of tracer peak. This can be difficult to model quantitatively since additional assumptions may be made about fluid distribution into each stage and cluster. However, the change in tracer peak may not be significant if the majority of tracer is released during shut-in. In other words, the effect on tracer response will be greater for earlier stages than for later stages. In addition, for pH triggered tracer release, pH slug could be introduced during drill out stage.

Conclusions. A novel tracer-eluting proppant system is introduced for hydraulic fracturing to characterize the length of propped fractures. This technique improves on the direct injection of tracers in frac water. This technique can be tested in more complex fracture geometry in laboratories and in the field-scale.

The following conclusions can be drawn from this work. Tracers can be incorporated in polymeric coatings around common proppants (e.g., sand). The tracer release rate can be a function of pH, salinity and temperature. As the temperature increases, the tracer release rate can increase. Little tracer may be released below 60° C. in fresh water. As pH increases, the tracer release rate can increase. At moderate temperatures, tracer release can change significantly between pH 8 and 9. As salinity increases, the tracer release rate can increase. Tracer release can change significantly between fresh water and 50,000 ppm salinity. The polymeric system can be designed for the formation brine and temperature of specific reservoirs. The tracer concentration in the flow-back water is a function of proppant position in the fracture, as shown in the single fracture core-scale tests. The tracer-eluting proppant position can be estimated from the tracer concentration profile in a single fracture. A numerical model based on convection, dispersion and mass transfer has been developed that matches experimental tracer concentration profiles.

Figure Captions. FIG. 4A and FIG. 4B: Optical micrograph of (FIG. 4A) uncoated sand and (FIG. 4B) sand coated with polymer and Rhodamine 6G.

Figure 5:
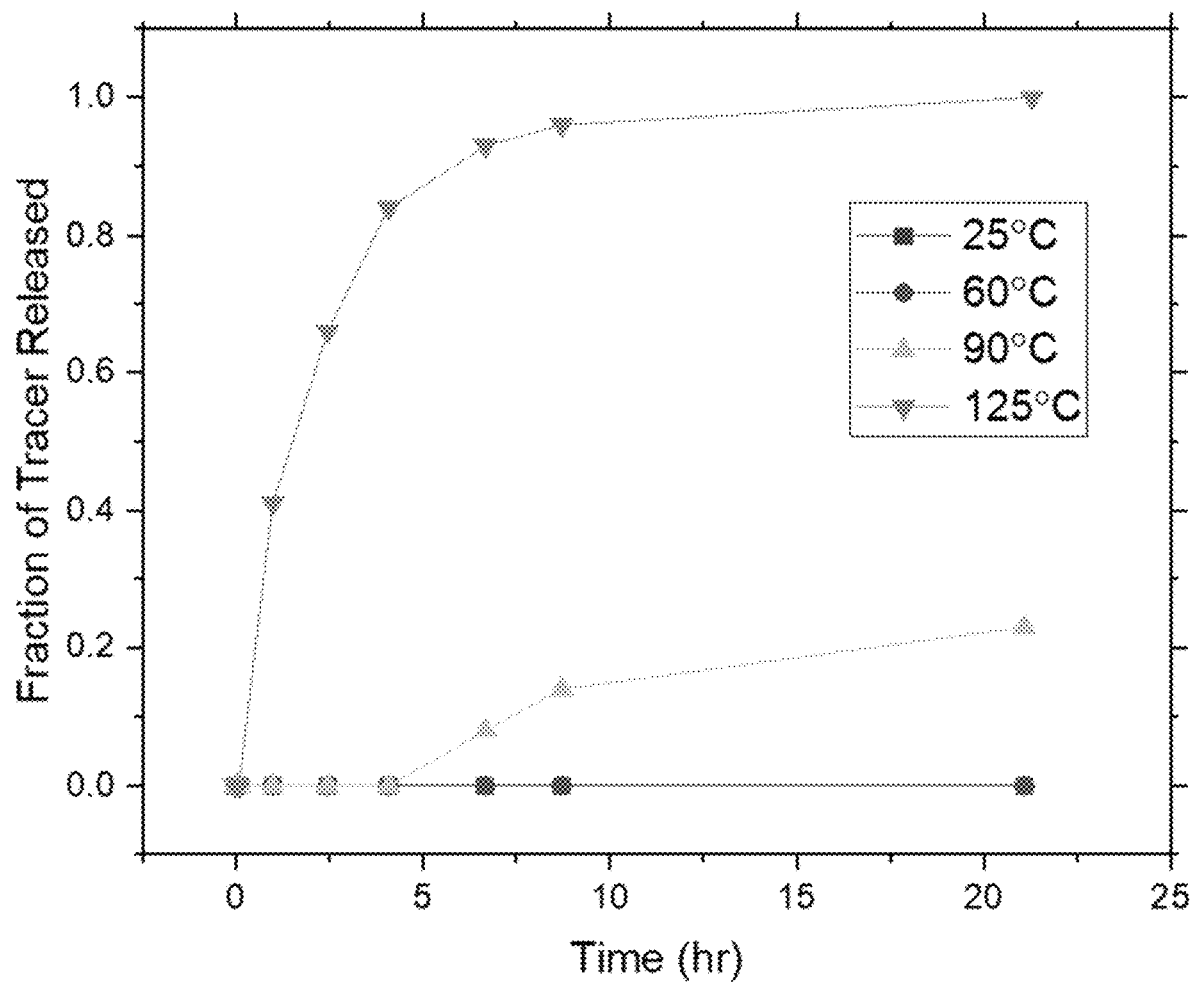
FIG. 5 provides data showing fraction of tracer released as a function of time for different temperatures; note that the points at 25° C. overlap with the points at 60° C.
Figure 6A:
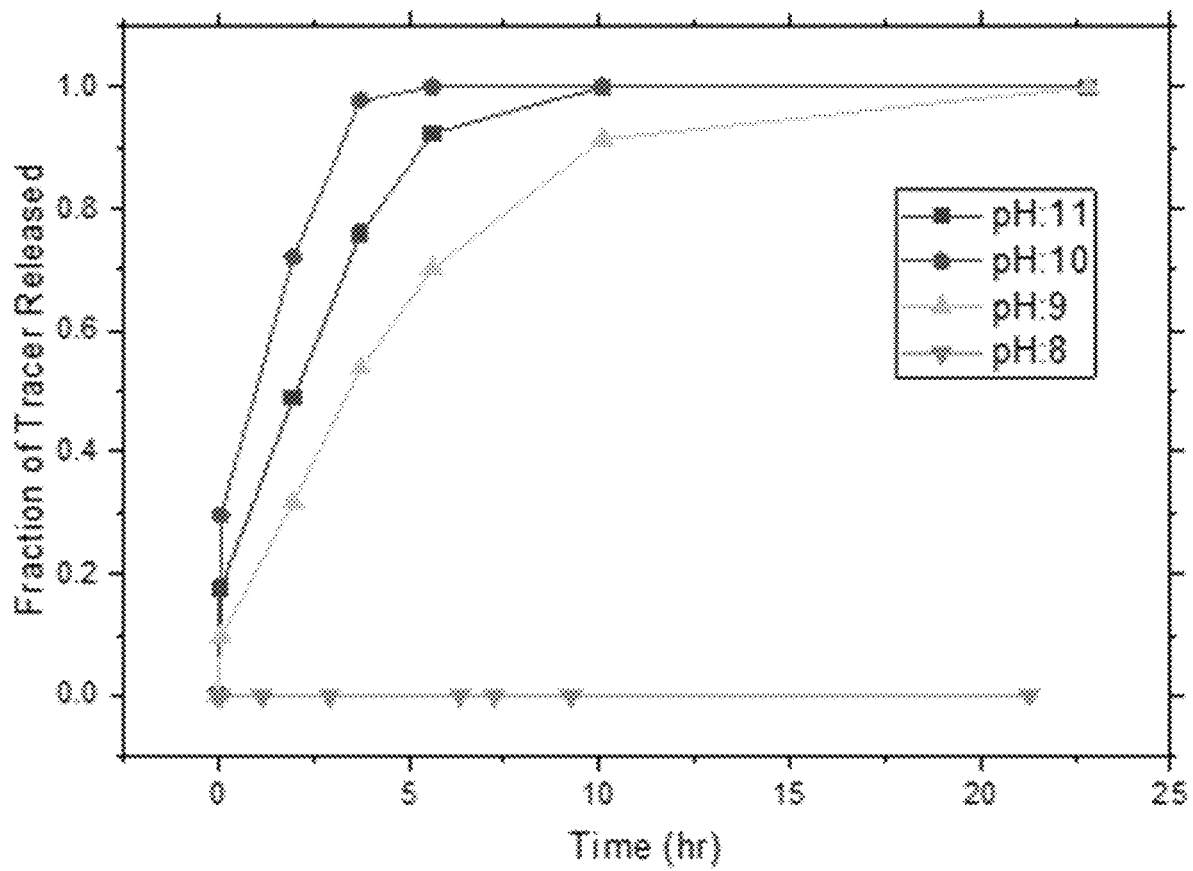
FIG. 6A, FIG. 6B, FIG. 6C, and FIG. 6D provide data showing fraction of tracer releases as a function of time for different pH conditions at (FIG. 6A) 25° C., (FIG. 6B) 60° C., (FIG. 6C) 90° C., (FIG. 6D) 125° C.
Figure 6B:
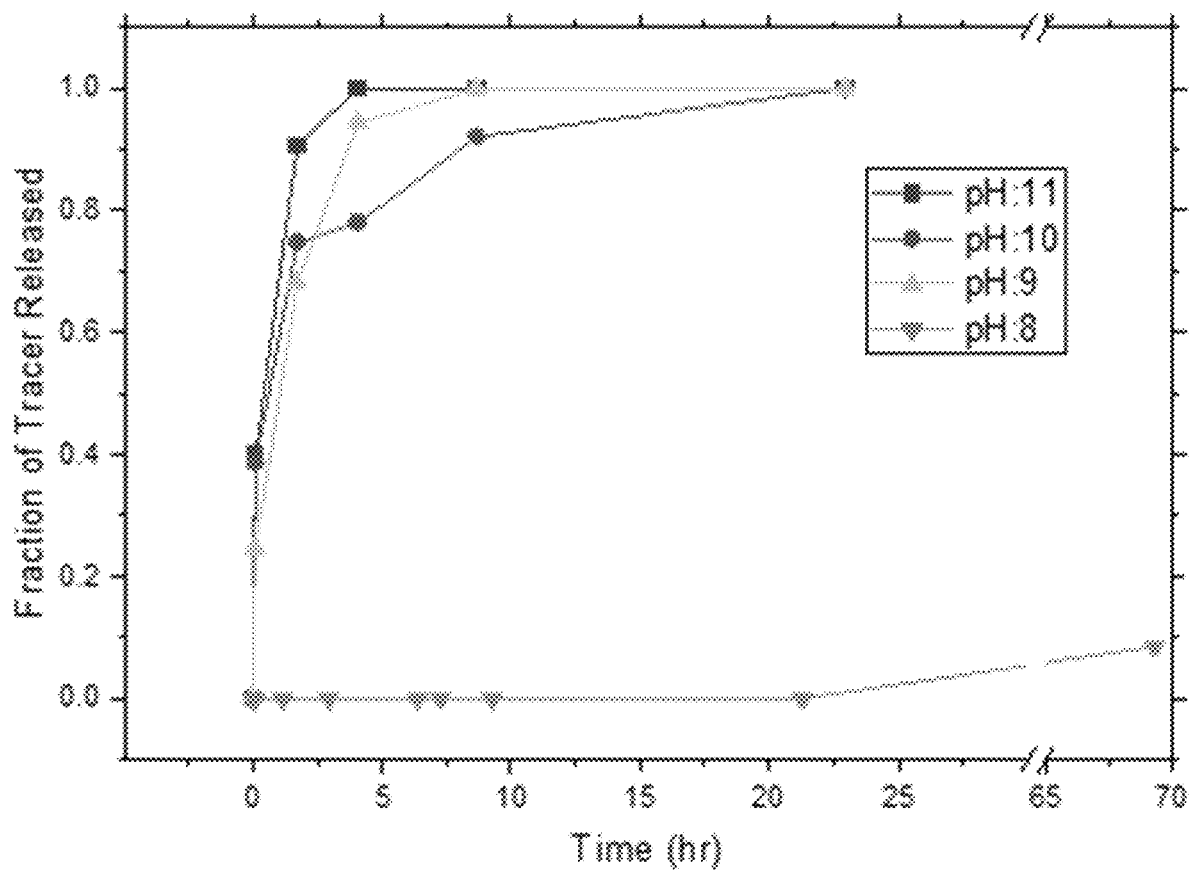
Figure 6C:
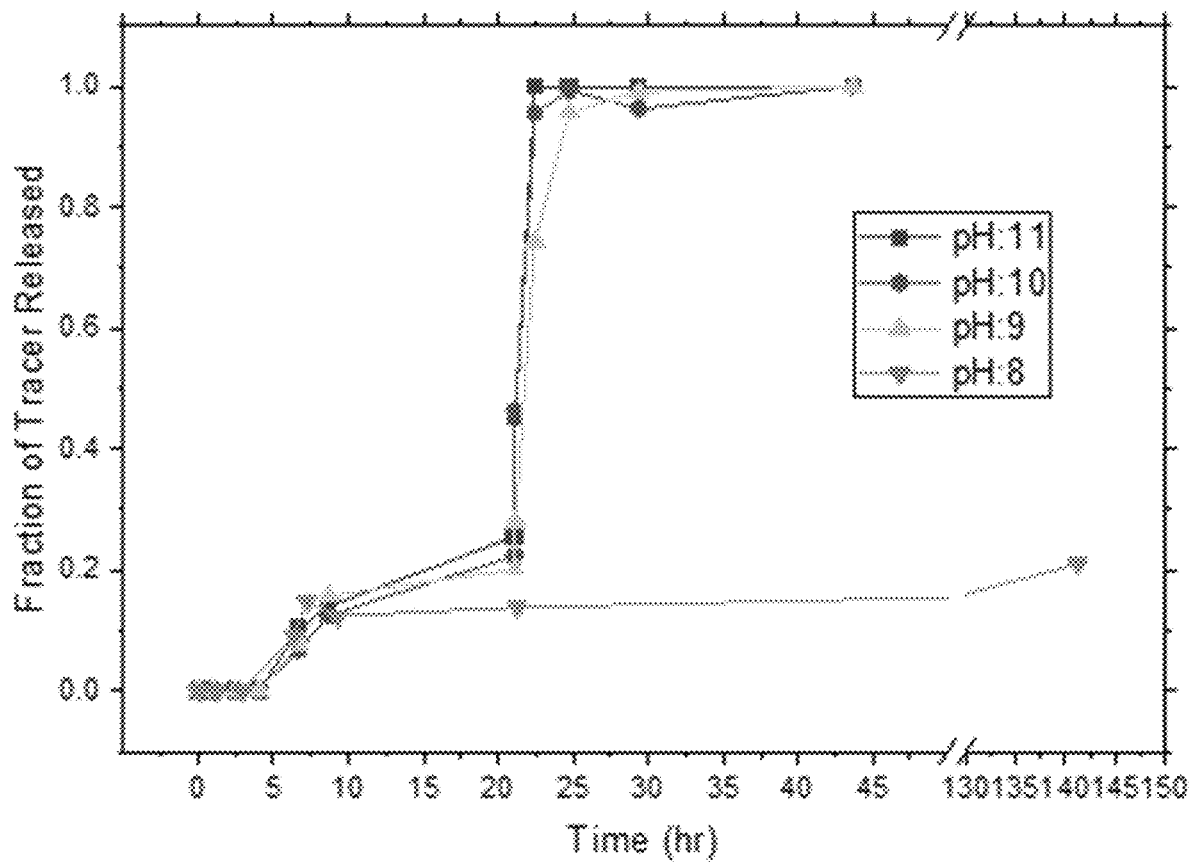
Figure 6D:
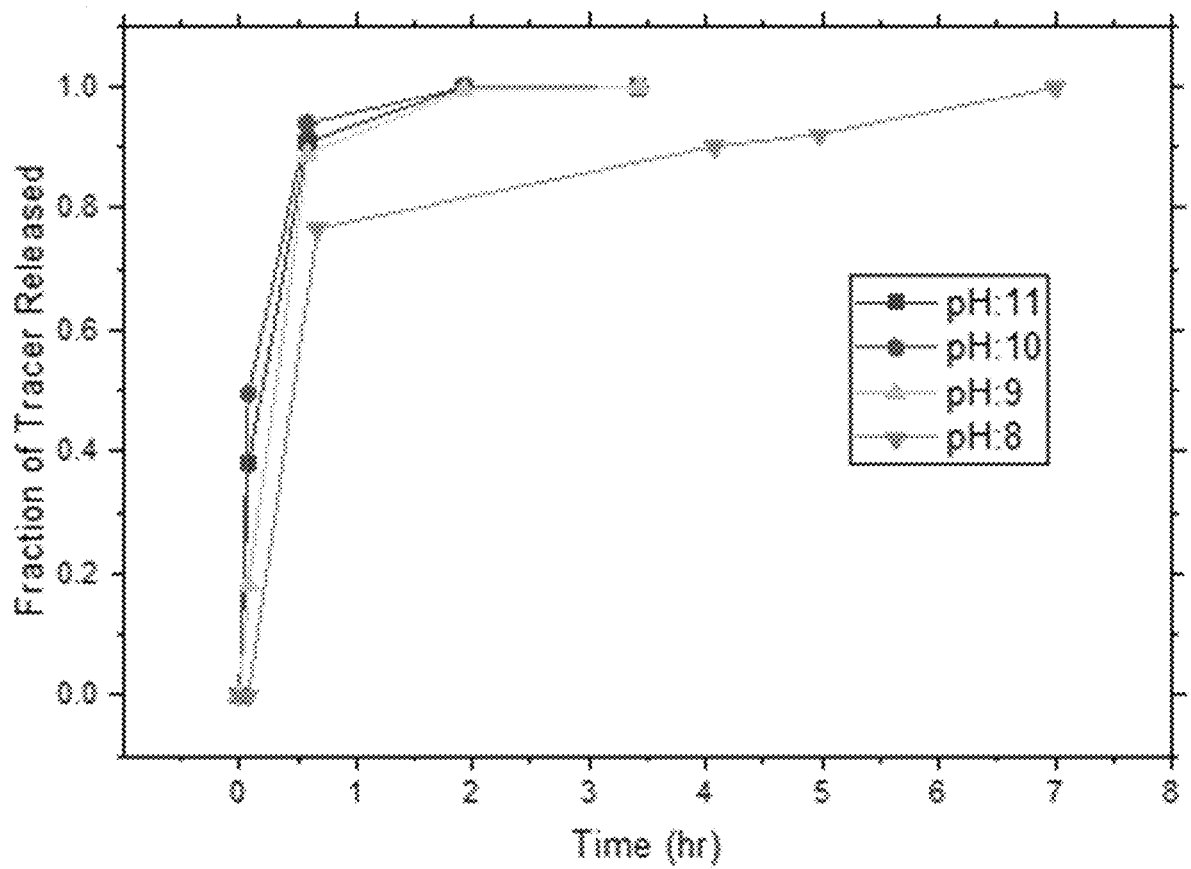

FIG. 5: Fraction of tracer releases as a function of time for different temperature, note that the points at 25° C. overlap with the points at 60° C.

FIG. 6A, FIG. 6B, FIG. 6C, and FIG. 6D: Fraction of tracer releases as a function of time for different pH conditions at (FIG. 6A) 25° C., (FIG. 6B) 60° C., (FIG. 6C) 90° C., (FIG. 6D) 125° C.

Figure 7A:
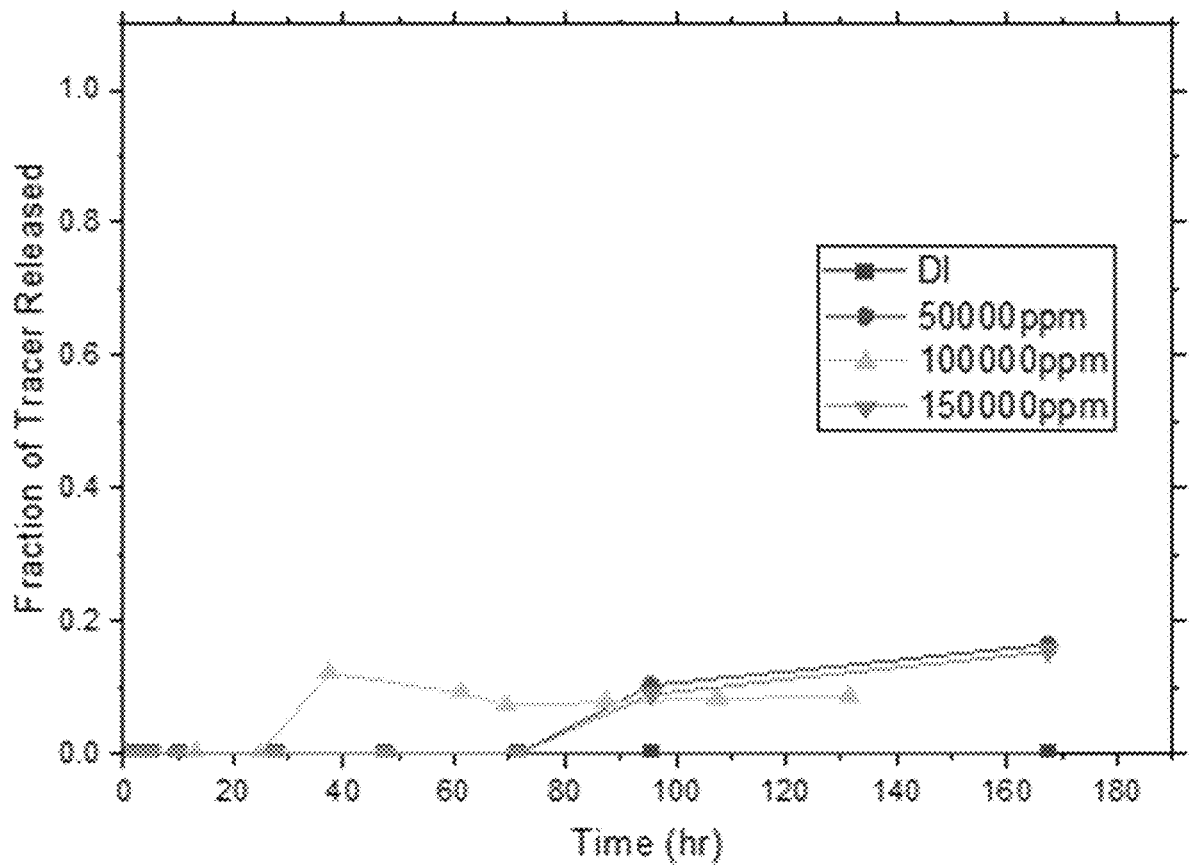
FIG. 7A, FIG. 7B, and FIG. 7C provide data showing fraction of tracer releases as a function of time for different salinity conditions at (FIG. 7A) 25° C., (FIG. 7B) 60° C., (FIG. 7C) 90° C.
Figure 7B:
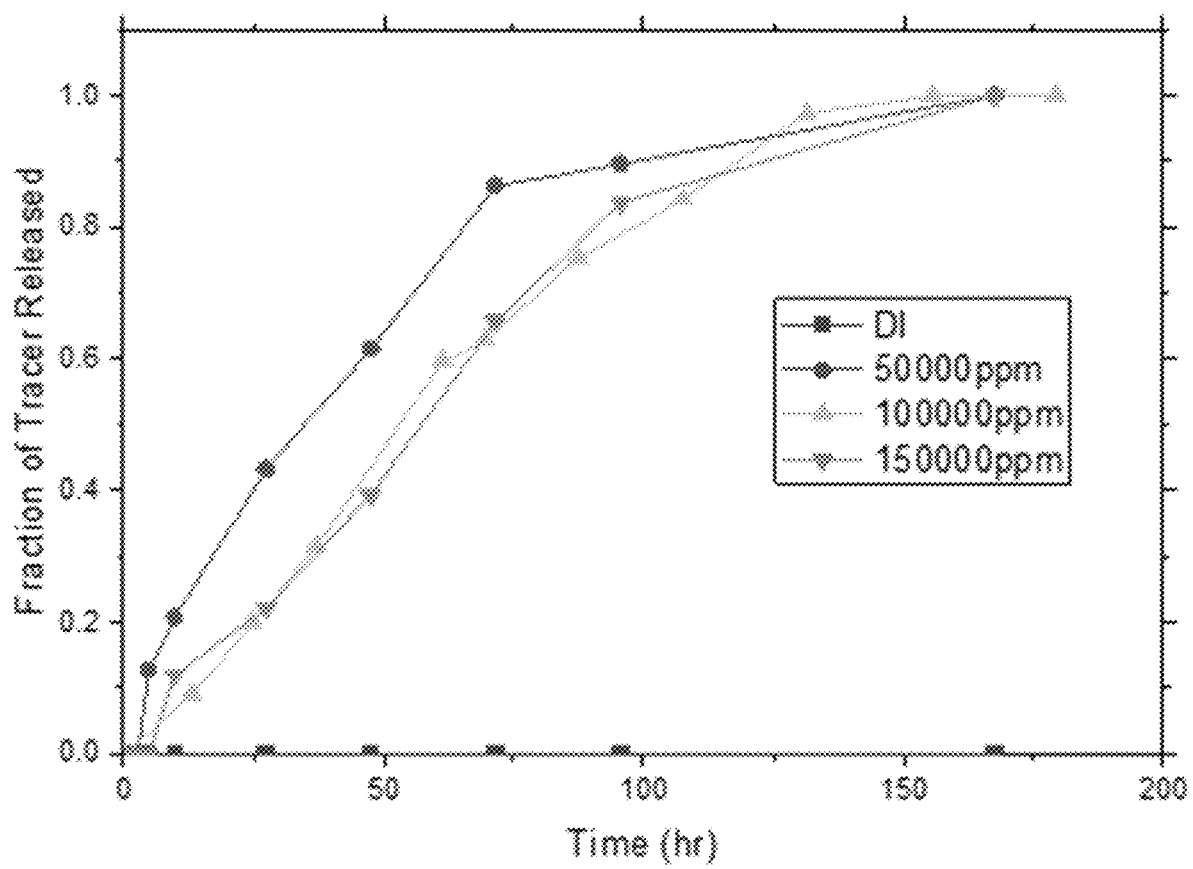
Figure 7C:
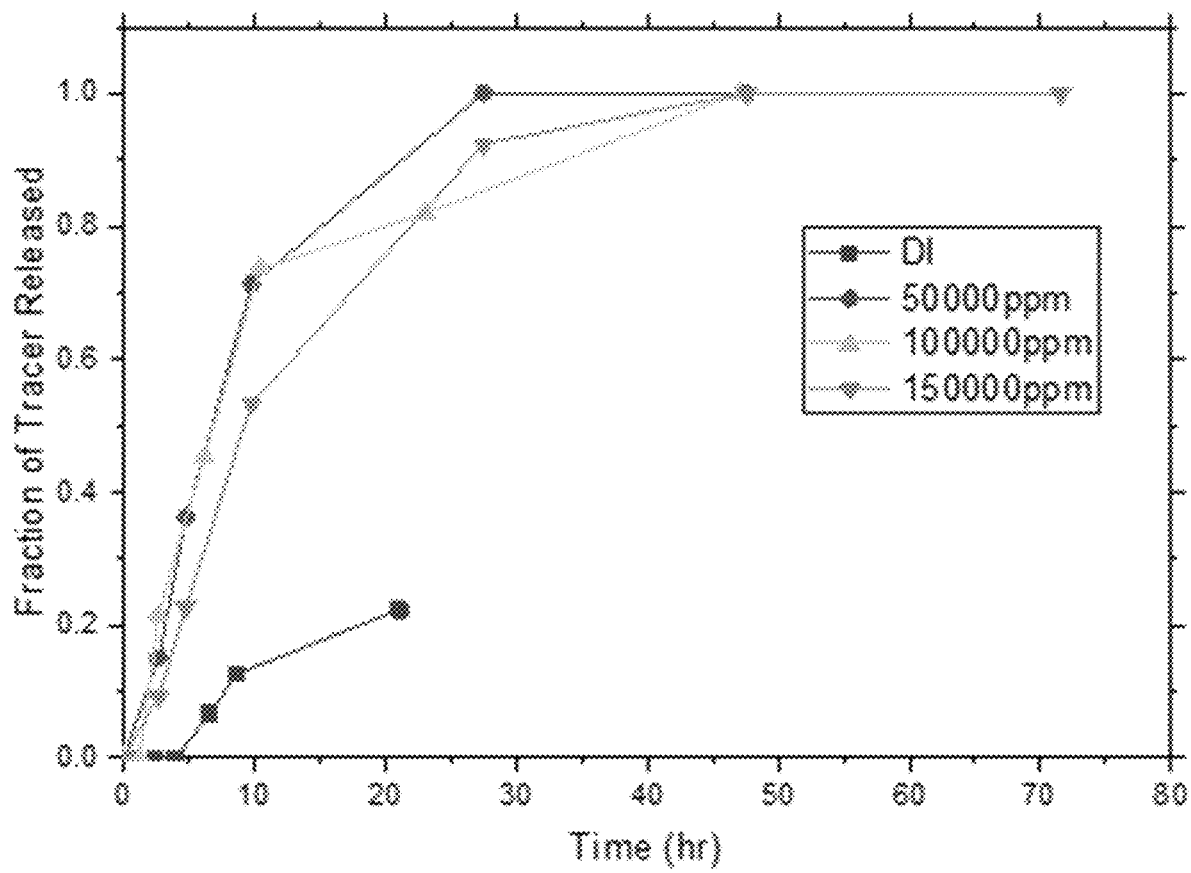

FIG. 7A, FIG. 7B, and FIG. 7C: Fraction of tracer releases as a function of time for different salinity conditions at (FIG. 7A) 25° C., (FIG. 7B) 60° C., (FIG. 7C) 90° C.

Figure 8A:
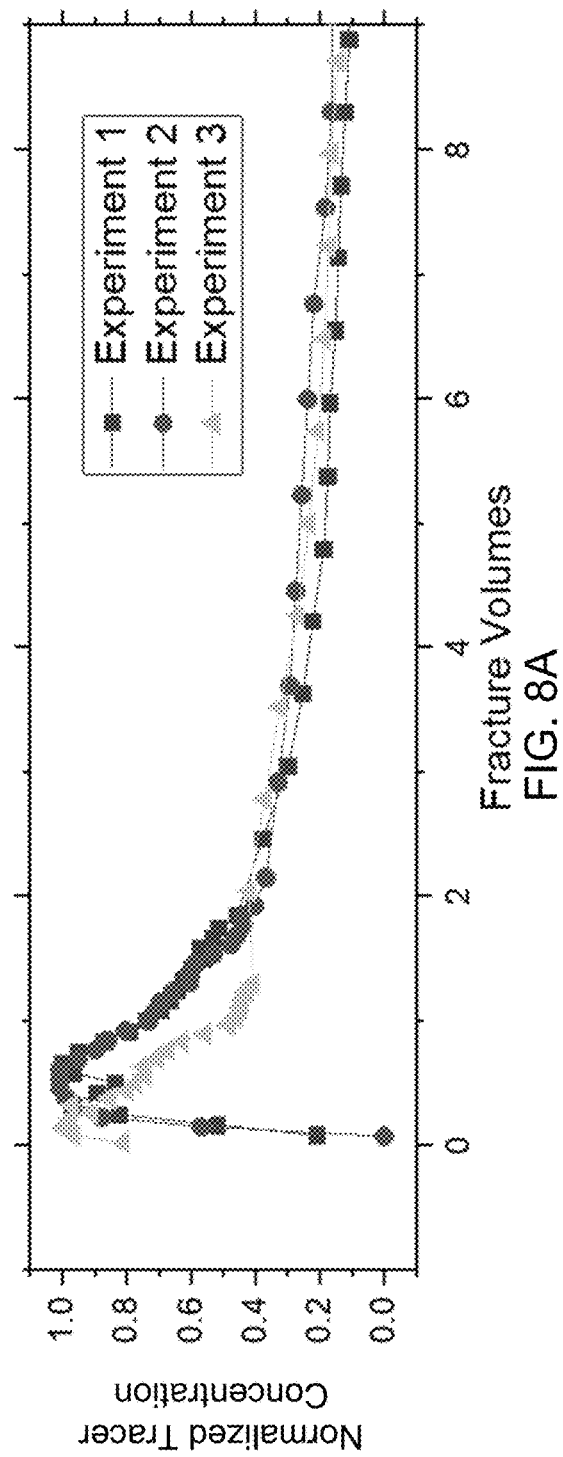
FIG. 8A and FIG. 8B provide data showing normalized tracer concentration profiles for three elution experiments.
Figure 8B:
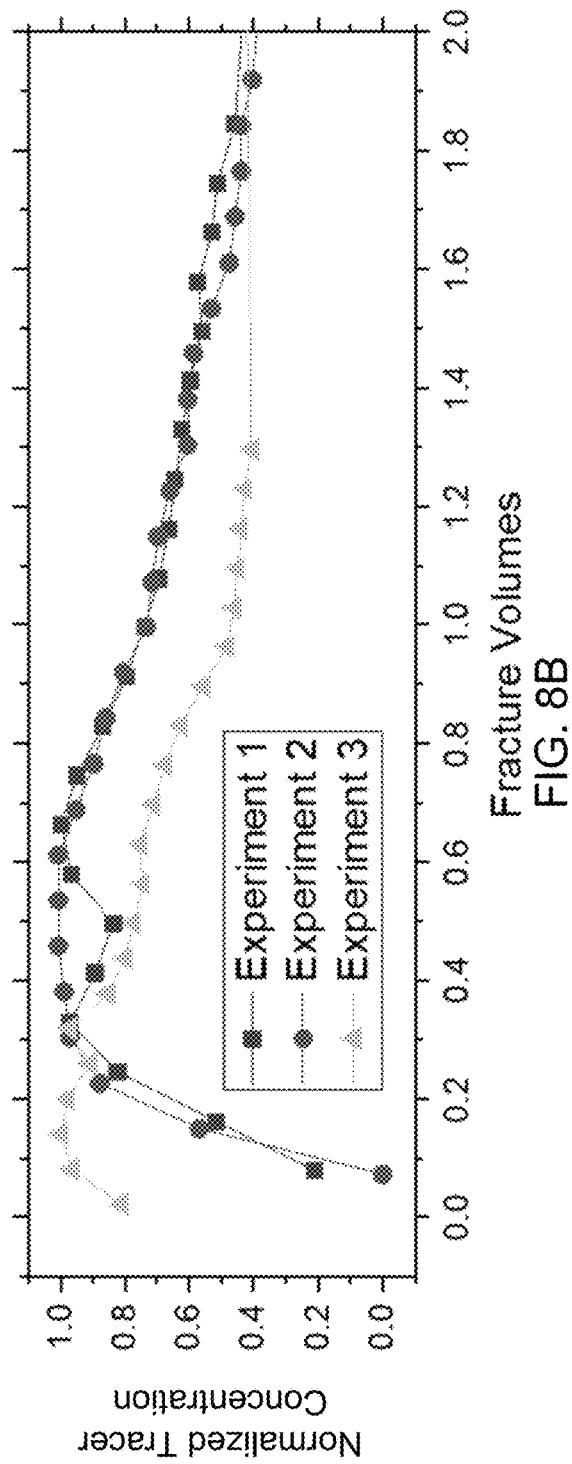

FIG. 8A and FIG. 8B: Normalized tracer concentration profile for Experiment 1-3. (FIG. 8A) Complete profiles from 0-8 FVs, (FIG. 8B) Profiles from 0-2 FVs.

FIG. 9: Images of core halves after the elution experiments. From top to bottom: Exp. 1, 2 and 3, respectively. Proppants were left as is in the pictures.

FIG. 10: Comparison of tracer recovery curves for Experiment 1-3 and numerical solutions.

REFERENCES

U.S. Patent Application Publication Nos. US 2010/0307745 and US 2016/0075937.
U.S. Pat. Nos. 6,723,683 and 6,645,769.
PCT International Application Publication Nos. WO 2013/078031 and WO 2014/144464.
Asadi, M., Woodroof, R. W., Malone, W. S., Shaw, D. R., 2002. Monitoring Fracturing Fluid Flow-back With Chemical Tracers: A Field Case Study. Presented at the SPE Annual Technical Conference and Exhibition, Society of Petroleum Engineers. DOI: 10.2118/77750-MS
Bae, Y., Nishiyama, N., Fukushima, S., Koyama, H., Yasuhiro, M., Kataoka, K., 2005. Preparation and Biological Characterization of Polymeric Micelle Drug Carriers with Intracellular pH-Triggered Drug Release Property: Tumor Permeability, Controlled Subcellular Drug Distribution, and Enhanced in vivo Antitumor Efficacy. Bioconjugate Chem. 16, 122-130. DOI: 10.1021/bc0498166
Basu, S., Sharma, M. M., 2014. A New Method for Fracture Diagnostics Using Low Frequency Electromagnetic Induction. Presented at the SPE Hydraulic Fracturing Technology Conference, Society of Petroleum Engineers. DOI: 10.2118/168606-MS
Bhatia, K., Pande, K., 2016. First Application of Nonradioactive Tracer Technology in CSG Unconventional Basin in Central India: Optimization and Evaluation of Fracturing Treatment. Presented at the SPE Asia Pacific Hydraulic Fracturing Conference, Society of Petroleum Engineers. DOI: 10.2118/181782-MS
Catlett, R. D., Spencer, J. D., Lolon, E., Bucior, D., 2013. Evaluation of Two Horizontal Wells in the Eagle Ford Using Oil-Based Chemical Tracer Technology to Optimize Stimulation Design. Presented at the SPE Hydraulic Fracturing Technology Conference, Society of Petroleum Engineers. DOI: 10.2118/163846-MS
Cipolla, C. L., Wright, C. A., 2002. Diagnostic Techniques To Understand Hydraulic Fracturing: What? Why? and How? SPE Production & Facilities 17, 23-35. DOI: 10.2118/75359-PA
Eisner, L., Thornton, M., Griffin, J., 2011. Challenges for microseismic monitoring, in: SEG Technical Program Expanded Abstracts 2011, SEG Technical Program Expanded Abstracts. Society of Exploration Geophysicists, pp. 1519-1523. DOI: 10.1190/1.3627491
Fisher, M. K., Warpinski, N. R., 2012. Hydraulic-Fracture-Height Growth: Real Data. SPE Production & Operations 27, 8-19. DOI: 10.2118/145949-PA
Gardien, C. J., Pope, G. A., Hill, A. D., 1996. Hydraulic Fracture Diagnosis Using Chemical Tracers. Presented at the SPE Annual Technical Conference and Exhibition, Society of Petroleum Engineers. DOI: 10.2118/36675-MS
Goswick, R. A., LaRue, J. L., 2014. Utilizing Oil Soluble Tracers to Understand Stimulation Efficiency Along the Lateral. Presented at the SPE Annual Technical Conference and Exhibition, Society of Petroleum Engineers. DOI: 10.2118/170929-MS
Johnson, L. M., Shepherd, S. D., Rothrock, G. D., Cairns, A. J., Al-Muntasheri, G. A., 2016. Core/Shell Systems for Delayed Delivery of Concentrated Mineral Acid. SPE Production & Operations 31, 351-361. DOI: 10.2118/173734-PA King, G. E., Leonard, R. S., 2011. Deciphering Chemical Tracer Results in Multi-Fractured Well Backflow in Shales: A Framework for Optimizing Fracture Design and Application. Presented at the SPE Hydraulic Fracturing Technology Conference, Society of Petroleum Engineers. DOI: 10.2118/140105-MS Kumar, A., Sharma, M. M., 2018. Diagnosing Fracture-Wellbore Connectivity Using Chemical Tracer Flow-back Data. Presented at the SPE/AAPG/SEG Unconventional Resources Technology Conference, Unconventional Resources Technology Conference. DOI: 10.15530/URTEC-2018-2902023

Li, J., Pei, Y., Jiang, H., Zhao, L., Li, L., Zhou, H., Zhao, Y., Zhang, Z., 2016. Tracer Flow-back Based Fracture Network Characterization in Hydraulic Fracturing. Presented at the Abu Dhabi International Petroleum Exhibition & Conference, Society of Petroleum Engineers. DOI: 10.2118/183444-MS Maxwell, S. C., Urbancic, T. I., Steinsberger, N., Zinno, R., 2002. Microseismic Imaging of Hydraulic Fracture Complexity in the Barnett Shale. Presented at the SPE Annual Technical Conference and Exhibition, Society of Petroleum Engineers. DOI: 77440-MS McDaniel, R. R., Borges, J., Dakshindas, S. S., 2007. A New Environmentally Acceptable Technique for Determination of Fracture Height and Width. Presented at the SPE Annual Technical Conference and Exhibition, Society of Petroleum Engineers. DOI: 10.2118/109969-MS McDaniel, R. R., Holmes, D. V., Borges, J., Bajoie, B. J., Peeples, C., Gardner, R., 2009. Determining Propped Fracture Width from a New Tracer Technology. Presented at the SPE Hydraulic Fracturing Technology Conference, Society of Petroleum Engineers. DOI: 10.2118/119545-MS Muhammad, F., Guo, M., Qi, W., Sun, F., Wang, A., Guo, Y., Zhu, G., 2011. pH-Triggered Controlled Drug Release from Mesoporous Silica Nanoparticles via Intracelluar Dissolution of ZnO Nanolids. J. Am. Chem. Soc. 133, 8778-8781. DOI: 10.1021/ja200328s Robinson, B. A., Tester, J. W., Brown, L. F., 1988. Reservoir Sizing Using Inert and Chemically Reacting Tracers. SPE Formation Evaluation 3, 227-234. DOI: 10.2118/13147-PA Roussel, N. P., Agrawal, S., 2017. Introduction to Poroelastic Response Analysis—Quantifying Hydraulic Fracture Geometry and SRV Permeability from Offset-Well Pressure Data, in: Proceedings of the 5th Unconventional Resources Technology Conference. Presented at the Unconventional Resources Technology Conference, American Association of Petroleum Geologists, Austin, Tex., USA. DOI: 10.15530/urtec-2017-2645414

Salman, A., Kurtoglu, B., Kazemi, H., 2014. Analysis of Chemical Tracer Flow-back in Unconventional Reservoirs. Presented at the SPE/CSUR Unconventional Resources Conference—Canada, Society of Petroleum Engineers. DOI: 10.2118/171656-MS Seth, P., Manchanda, R., Kumar, A., Sharma, M., 2018. Estimating Hydraulic Fracture Geometry by Analyzing the Pressure Interference Between Fractured Horizontal Wells, in: SPE Annual Technical Conference and Exhibition. Presented at the SPE Annual Technical Conference and Exhibition, Society of Petroleum Engineers, Dallas, Tex., USA. DOI: 10.2118/191492-MS Shook, G. M., Pope, G. A., Asakawa, K., 2009. Determining Reservoir Properties and Flood Performance From Tracer Test Analysis. Presented at the SPE Annual Technical Conference and Exhibition, Society of Petroleum Engineers. DOI: 10.2118/124614-MS Siepmann, F., Siepmann, J., Walther, M., MacRae, R. J., Bodmeier, R., 2008. Polymer blends for controlled release coatings. Journal of Controlled Release 125, 1-15. DOI: 10.1016/j.jconrel.2007.09.012

Tang, J. S., Harker, B., 1991. Interwell Tracer Test To Determine Residual Oil Saturation In A Gas-Saturated Reservoir. Part I: Theory And Design. Journal of Canadian Petroleum Technology 30. DOI: 10.2118/91-03-08

Tong, S., K. Mohanty, K., 2016. Proppant transport study in fractures with intersections. Fuel 181, 463-477. DOI: 10.1016/j.fuel.2016.04.144

Warpinski, N. R., Mayerhofer, M. J., Vincent, M. C., Cipolla, C. L., Lolon, E., 2008. Stimulating Unconventional Reservoirs: Maximizing Network Growth While Optimizing Fracture Conductivity. Presented at the SPE Unconventional Reservoirs Conference, Society of Petroleum Engineers. DOI: 10.2118/114173-MS Watson, W. P., Aften, C. W., Previs, D. J., 2010. Delayed-Release Coatings for Oxidative Breakers. Presented at the SPE International Symposium and Exhibition on Formation Damage Control, Society of Petroleum Engineers. DOI: 10.2118/127895-MS Weng, X., Kresse, O., Cohen, C.-E., Wu, R., Gu, H., 2011. Modeling of Hydraulic-Fracture-Network Propagation in a Naturally Fractured Formation. SPE Production & Operations 26, 368-380. DOI: 10.2118/140253-PA Zhang, P., Sen, M. K., Sharma, M. M., Gabelmann, J., Glowka, D., 2018. Mapping Proppant Distribution in Hydraulic Fractures in Cased Wellbores Using Low Frequency Downhole Electrical Measurements. Presented at the SPE Hydraulic Fracturing Technology Conference and Exhibition, Society of Petroleum Engineers. DOI: 10.2118/189884-MS Zhao, B., Panthi, K., Mohanty, K., 2019. Tracer Eluting Proppants for Shale Fracturing. Unconventional Resources Technology Conference, Society of Petroleum Engineers. DOI: 10.15530/urtec-2019-478

Zoback, M. D., Kohli, A., Das, I., Mcclure, M. W., 2012. The Importance of Slow Slip on Faults During Hydraulic Fracturing Stimulation of Shale Gas Reservoirs. Presented at the SPE Americas Unconventional Resources Conference, Society of Petroleum Engineers. DOI: 10.2118/155476-MS Statements Regarding Incorporation by Reference and Variations All references throughout this application, for example patent documents including issued or granted patents or equivalents; patent application publications; and non-patent literature documents or other source material; are hereby incorporated by reference herein in their entireties, as though individually incorporated by reference.

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art.

When a group of substituents is disclosed herein, it is understood that all individual members of those groups and all subgroups and classes that can be formed using the substituents are disclosed separately. When a Markush group or other grouping is used herein, all individual members of the group and all combinations and subcombinations possible of the group are intended to be individually included in the disclosure. As used herein, "and/or" means that one, all, or any combination of items in a list separated by "and/or" are included in the list; for example "1, 2 and/or 3" is equivalent to "'1' or '2' or '3' or '1 and 2' or '1 and 3' or '2 and 3' or '1, 2 and 3'".

Every formulation or combination of components described or exemplified can be used to practice the invention, unless otherwise stated. Specific names of materials are intended to be exemplary, as it is known that one of ordinary skill in the art can name the same material differently. It will be appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a temperature range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. A proppant composition comprising:
   a proppant particle; and
   a coating on a surface of the proppant particle, the coating comprising a tracer and a polymer,
   wherein the coating has a thickness of from 1 μm to 20 μm and a concentration or loading of the tracer in the coating is from 0.05 wt. % to 5 wt. %, and
   wherein the coating is activatable or configured to activate under temperature, pH, and salinity conditions within fractures in a subterranean reservoir to release the tracer to a fluid within the fractures for identifying a position of the proppant composition or extent of fracturing within the subterranean reservoir.

2. The proppant composition of claim 1, wherein the coating encapsulates the proppant particle.

3. The proppant composition of claim 1, wherein the tracer is releasable from the coating to an aqueous solution over time.

4. The proppant composition of claim 3, wherein the aqueous solution has a temperature greater than 25° C.

5. The proppant composition of claim 3, wherein the aqueous solution has a pH greater than 8 or greater than 9.

6. The proppant composition of claim 3, wherein the aqueous solution has a pH less than 8.

7. The proppant composition of claim 3, wherein the aqueous solution has a salinity greater than 10000 ppm.

8. The proppant composition of claim 3, wherein the aqueous solution has a salinity less than 10000 ppm.

9. The proppant composition of claim 1, wherein the tracer is homogeneously distributed in the polymer in the coating.

10. The proppant composition of claim 1, wherein the tracer comprises a dye, a rare earth organometallic complex, fluorobenzoic acids, nanoparticles, radioactive tracers, or any combination of these.

11. The proppant composition of claim 1, wherein the polymer comprises a methacrylic acid polymer, an acrylate polymer, methacrylic acid-ethylacrylate copolymer, or any combination or copolymers of these.

12. The proppant composition of claim 1, wherein the coating is activatable upon contact with an aqueous solution having one or more of: a temperature greater than 25° C., a pH greater than 8, or a salinity greater than 10000 ppm.

13. The proppant composition of claim 1, further comprising one or more additional proppant particles lacking the coating.

14. A method of identifying a proppant position in a subterranean reservoir, the method comprising:
   providing a proppant composition, the proppant composition comprising:
      a proppant particle;
      a coating on a surface of the proppant particle, the coating comprising a tracer and a polymer,
      wherein the coating has a thickness of from 1 μm to 20 μm and a concentration or loading of the tracer in the coating is from 0.05 wt. % to 5 wt. %, and
      wherein the coating is activatable or configured to activate under temperature, pH, and salinity conditions within fractures in a subterranean reservoir to release the tracer to a fluid within the fractures for identifying a position of the proppant composition or extent of fracturing within the subterranean reservoir;
   injecting the proppant composition into the subterranean reservoir;
   producing a fluid from the subterranean reservoir;
   detecting a concentration of the tracer in the fluid produced from the subterranean reservoir as a function of time; and
   analyzing the concentration of the tracer to identify a position of the proppant composition in the subterranean reservoir.

15. The method of claim 14, wherein injecting the proppant composition into the subterranean reservoir includes positioning the proppant composition within fractures in the subterranean reservoir.

16. The method of claim 14, further comprising identifying temperature, pH, or salinity conditions in the subterranean reservoir and identifying the proppant composition based on the temperature, pH, or salinity conditions in the subterranean reservoir.

17. The method of claim 14, wherein analyzing the concentration of the tracer includes using a numerical model for tracer transport.

18. The method of claim 17, wherein the numerical model includes a dispersion coefficient, a mass transfer coefficient, a fracture porosity, a coating volume factor for the proppant particle, and a tracer partitioning factor.

19. The method of claim 17, wherein the numerical model includes temperature, pH, or salinity conditions in the subterranean reservoir.

20. The method of claim 14, further comprising:
providing a second proppant composition, the second proppant composition comprising a second tracer;
injecting the second proppant composition into the subterranean reservoir;
detecting a concentration of the second tracer in the fluid produced from the subterranean reservoir as a function of time; and
analyzing the concentration of the second tracer to identify a position of the second proppant composition in the subterranean reservoir.

21. The method of claim 14, wherein injecting the proppant composition into the subterranean reservoir comprises activating the coating by contacting the coating with an aqueous solution having one or more of: a temperature greater than 25° C., a pH greater than 8, or a salinity greater than 10000 ppm, wherein the tracer is released from the coating to the aqueous solution upon activation.

22. A method of making a proppant composition, the method comprising:
providing a proppant particle;
contacting the proppant particle with a polymeric solution to form a solution coated proppant particle, the polymeric solution comprising a polymer, a tracer, and a solvent; and
subjecting the solution coated proppant particle to conditions to evaporate solvent from the solution coated proppant particle to form a tracer coated proppant particle, the tracer coated proppant particle comprising:
the proppant particle; and
a coating on a surface of the proppant particle, the coating comprising the tracer and the polymer,
wherein the coating has a thickness of from 1 μm to 20 μm and a concentration or loading of the tracer in the coating is from 0.05 wt. % to 5 wt. %, and
wherein the coating is activatable or configured to activate under temperature, pH, and salinity conditions within fractures in a subterranean reservoir to release the tracer to a fluid within the fractures for identifying a position of the proppant composition or extent of fracturing within the subterranean reservoir.

23. The method of claim 22, wherein the tracer comprises a dye, a rare earth organometallic complex, fluorobenzoic acids, nanoparticles, radioactive tracers, or any combination of these.

24. The method of claim 22, wherein the polymer comprises a methacrylic acid polymer, an acrylate polymer, methacrylic acid-ethylacrylate copolymer, or any combination or copolymer of these.

25. The method of claim 22, wherein the solvent comprises acetone, dichloromethane, methyl ethyl ketone, dimethyl formamide, or any combination of these.

26. The method of claim 22, further comprising mixing the tracer coated proppant particle with one or more additional proppant particles lacking the coating.

27. The method of claim 22, further comprising preparing the polymeric solution.

28. The method of claim 22, further comprising identifying temperature, pH, or salinity conditions in the subterranean reservoir and preparing the polymeric solution based on the temperature, pH, or salinity conditions in the subterranean reservoir.

29. The method of claim 22, further comprising contacting the tracer coated proppant particle with an aqueous solution to release the tracer to the aqueous solution over time.

30. The method of claim 29, wherein the aqueous solution has a temperature greater than 25° C.

31. The method of claim 29, wherein the aqueous solution has a pH greater than 8 or greater than 3.

32. The method of claim 29, wherein the aqueous solution has a pH less than 8.

33. The method of claim 29, wherein the aqueous solution has a salinity greater than 20000 ppm.

34. The method of claim 29, wherein the aqueous solution has a salinity less than 10000 ppm.

* * * * *